(12) United States Patent
Mitsui et al.

(10) Patent No.: US 8,687,211 B2
(45) Date of Patent: Apr. 1, 2014

(54) IMAGE FORMING APPARATUS THAT DISPLAYS PLURAL PAGES OF DOCUMENT IMAGES IN THREE-DIMENSIONAL PREVIEW PRESENTATION

(75) Inventors: Hitoshi Mitsui, Osaka (JP); Hirohito Morioka, Osaka (JP)

(73) Assignee: Sharp Kabushiski Kaisha, Osaka (JP)

( * ) Notice: Subject to any disclaimer, the term of this patent is extended or adjusted under 35 U.S.C. 154(b) by 286 days.

(21) Appl. No.: 13/167,831

(22) Filed: Jun. 24, 2011

(65) Prior Publication Data

US 2011/0317195 A1    Dec. 29, 2011

(30) Foreign Application Priority Data

Jun. 25, 2010 (JP) ................................ 2010-145330

(51) Int. Cl.
*G06F 3/12* (2006.01)
*G06F 3/14* (2006.01)
*G06F 3/01* (2006.01)

(52) U.S. Cl.
USPC .......... 358/1.13; 715/702; 715/863; 715/864; 399/81

(58) Field of Classification Search
USPC ............. 358/1.13; 715/702, 863, 864; 399/81
See application file for complete search history.

(56) References Cited

U.S. PATENT DOCUMENTS

| 7,528,990 | B2 | 5/2009 | Lu et al. |
| 7,640,513 | B2* | 12/2009 | Card et al. ................... 715/776 |
| D624,932 | S * | 10/2010 | Chaudhri ..................... D14/488 |
| 2004/0207859 | A1 | 10/2004 | Kadoi et al. |
| 2007/0058210 | A1* | 3/2007 | Sakuramata et al. ......... 358/448 |
| 2008/0034381 | A1* | 2/2008 | Jalon et al. ................... 719/329 |
| 2008/0201378 | A1 | 8/2008 | Nagahara et al. |

FOREIGN PATENT DOCUMENTS

| JP | 2004-318581 A | 11/2004 |
| JP | 2006-3568 A | 1/2006 |
| JP | 2007-110677 A | 4/2007 |
| JP | 2008-205903 A | 9/2008 |
| JP | 2008-229851 A | 10/2008 |
| JP | 2009-253777 A | 10/2009 |

* cited by examiner

*Primary Examiner* — Fred Guillermety
(74) *Attorney, Agent, or Firm* — Birch, Stewart, Kolasch & Birch, LLP

(57) ABSTRACT

In an image forming apparatus including a control unit made of a display panel and a touch panel display for providing preview display, the touch panel display includes: a finished state preview controller for displaying the finished state of a hard copy formed by the image forming apparatus, on the display panel; and a confirmatory display controller for displaying preview images for confirmation in a turning manner. The display panel includes a first display area for displaying the finished state of the hard copy, a second display area for displaying a image of the page to be turned for confirmation and a third display area for displaying the images that have been displayed for confirmation, in order in a layered manner.

3 Claims, 19 Drawing Sheets

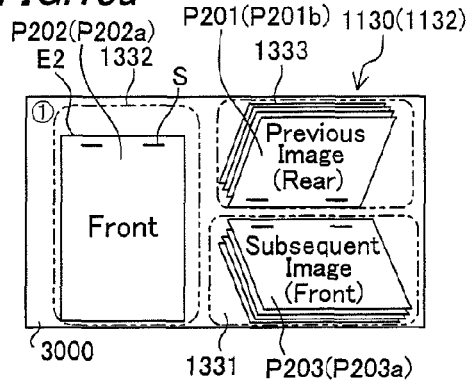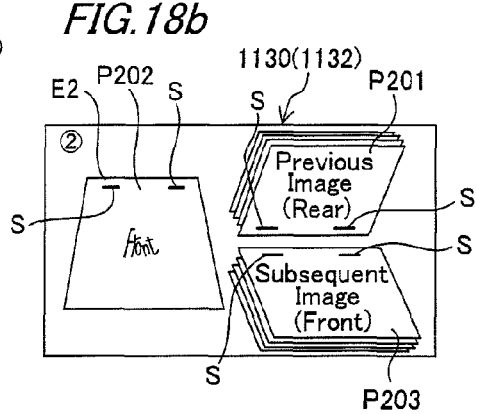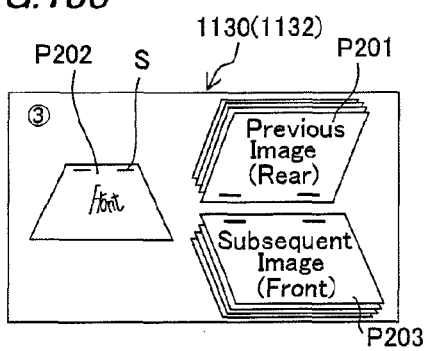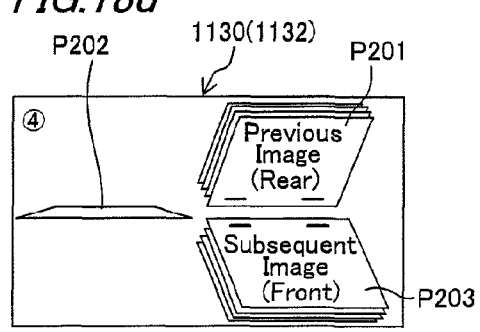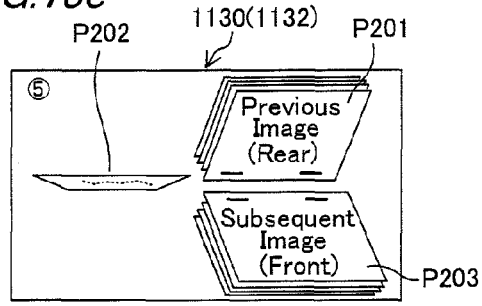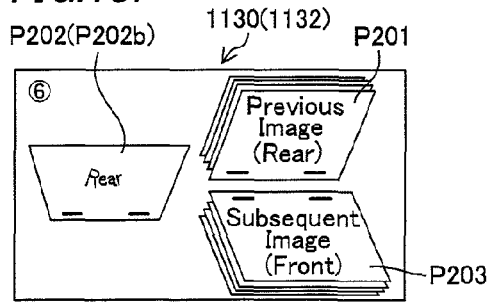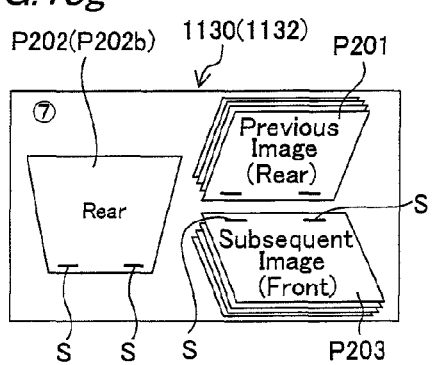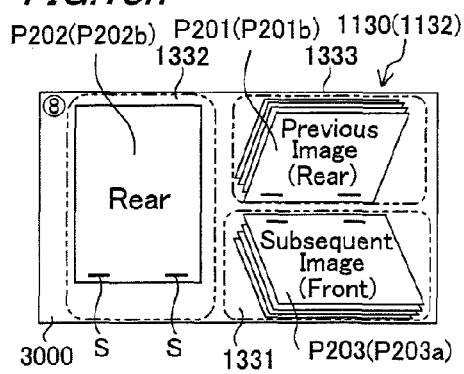

IMAGE FORMING APPARATUS THAT DISPLAYS PLURAL PAGES OF DOCUMENT IMAGES IN THREE-DIMENSIONAL PREVIEW PRESENTATION

This Nonprovisional application claims priority under 35 U.S.C. §119(a) on Patent Application No. 2010-145330 filed in Japan on 25 Jun. 2010, the entire contents of which are hereby incorporated by reference.

BACKGROUND OF THE INVENTION (1) Field of the Invention

The present invention relates to an image forming apparatus such as a copier, printer, facsimile machine or the like, in particular relating to an image forming apparatus equipped with an image display operating device capable of displaying plural pages of document images in preview representation.

(2) Description of the Prior Art

Conventionally, there have been recording systems which include a post-processing apparatus that performs stapling and/or other processes on hard copy to be output from an image forming apparatus so as to produce individual complete hard copy after an image forming process.

Conventionally, the image forming apparatus using this kind of recording system has no means for confirming what composition of pages the document images to be handled is made of, so there has occurred the problem that if a hard copy is printed out without reflecting user's intention, the completed copy only exhibits unwanted printout (unintended copy or printout), resulting in no use other than disposal and producing waste of recording paper, developer and power consumption.

To deal with this, recently there has been a proposal of an image forming apparatus including a preview function in order to enable the user to confirm what kind of hard copy is output, by displaying document images on a display screen provided on a control panel of the image forming apparatus.

As a prior art example, there has been a proposal of a system in which document images are displayed pagewise in a slidable manner on a display screen provided for an image forming apparatus so that the user can sequentially check and confirm the document images to be a hard copy (see Patent Document 1).

There is also another disclosed technology in which a recording material consisting of a plurality of pages is displayed in a three-dimensional representation on a display screen provided for an image forming apparatus so that the user is able to imagine the finished state of the hard copy (see Patent Document 2).

Patent Document 1:
Japanese Patent Application Laid-open 2009-253777
Patent Document 2:
Japanese Patent Application Laid-open 2007-110677

However, it is the status-quo that the user cannot grasp the concrete concept of the hard copy or cannot imagine the finished state of the hard copy only from the pagewise display of document images on the display screen as in the technology disclosed in Patent Document 1, causing failure to prevent erroneous copies and printout (cut down on the waste of supplies).

Further, the technology disclosed in Patent Document 2 entails the problem that it is impossible to check the details of the page images of the hard copy though the hard copy can be viewed in three dimensions. Further, since recorded surface on which the image is formed is displayed curvedly, there is the problem that it is difficult to check how the page of image being displayed for confirmatory is formed on the recording medium.

SUMMARY OF THE INVENTION

The present invention has been devised in view of the above prior art problems, it is therefore an object of the present invention to provide an image forming apparatus that enables the user to easily imagine the finished state of a hard copy to be completed before start of image forming, whereby it is possible to prevent copying failure and cut down on the waste of supplies.

The first aspect of the invention resides in an image forming apparatus that finishes recording mediums with images formed thereon as a hard copy, comprising: an input unit for acquiring image data; an image forming portion that forms images on recording mediums based on the image data input through the input unit; and, an image display operating device including a display portion that displays a preview image based on the image data and a display controller that has a function of presenting plural pages of document images in preview representation on the display portion, and is characterized in that the display controller includes: a finished state preview display controller that displays the finished state of the hard copy that the image forming apparatus can form as a preview image on the display portion and, a confirmatory display controller that displays the preview image displayed on the display portion so that each page of the preview image can be turned over, and, the display portion includes: as a preview display region for displaying the preview image, a first display area for three-dimensionally displaying the finished state of the hard copy; a second display area for displaying an image for each pages associated with the finished state that has been displayed in the first display area, while turning the page in turn; and, a third display area for three-dimensionally displaying the pages that have been turned in the second display area with the pages stacked in turned order, and the second display area displays an image of a next page once the next page is turned.

In the second aspect of the present invention, it is preferred that the first display area, the second display area and the third display area are arranged horizontally or vertically in order on the display screen of the display portion.

In the third aspect of the present invention, it is preferred that the first display area and the third display area are laid out in pair, separately from the second display area.

In the fourth aspect of the present invention, it is preferred that among the first display area, the second display area and the third display area, the second display area is the largest.

In the fifth aspect of the present invention, it is preferred that in the second display area, the image of the page to be turned is displayed frontward (in two-dimensional representation).

In the sixth aspect of the present invention, it is preferred that the images previous to or next to the image of the page to be turned, are displayed with a greater amount of information.

In the seventh aspect of the present invention, it is preferred that control keys for operation and control, i.e., so-called task trigger keys as scan-in key, a monochrome start key and a color start key, a clear-all key, etc., are constantly displayed in the display portion.

In the eighth aspect of the present invention, it is preferred that, after images of both sides of the page to be turned are displayed in turn in the second display area, these are fed to the third display area.

In the ninth aspect of the present invention, it is preferred that when image forming is performed on both sides of the recording mediums, in the second display area, before the image of the back side of the page to be turned is displayed, the image of the front side that has been displayed in the second display is made look like having rotated on the binding position.

In the tenth aspect of the present invention, it is preferred that when image forming is performed on both sides of the recording mediums, in the second display area, the image of the front side of the page to be turned is located closer to the first displaying area, and the image of the back side is located close to the third display area.

In the eleventh aspect of the present invention, it is preferred that when the hard copy is subjected to a binding process, each of document images of the hard copy, displayed in the display portion is displayed with a bound position in the hard copy.

According to the first aspect of the present invention, the user can not only check the relationship of the image of the page to be turned displayed in the second display area with the previous and subsequent document images but also can easily grasp the concrete concept of the whole hard copy. As a result, the user is able to imagine the finished state of the hard copy, hence it is possible to prevent copying failure and cut down on the waste of supplies.

According to the second aspect of the present invention, it is possible for the user to confirm the finished state of a hard copy in a similar feeling as if the user is turning pages of the actual hard copy.

According to the third aspect of the present invention, it is possible to easily recognize the bound condition of the hard copy and readily confirm the page position content of the image of the page to be turned.

According to the fourth aspect of the present invention, it is possible to improve the visibility when the document images are confirmed.

According to the five aspect of the present invention, it is possible to improve the visibility when the document images are confirmed.

According to the sixth aspect of the present invention, since the images before and after image of the page to be turned are displayed with greater amounts of information, it is possible to easily confirm the image information on pages immediately before and after the image of the page to be turned, especially in the case of duplex printing, hence grasp the relationship of the preview image displayed for confirmation with the images before and after, more easily.

According to the seventh aspect of the present invention, controlled keys for operation and control, i.e., so-called task trigger keys are constantly displayed in the display portion, so that the user is able to give a start command immediately after final confirmation of the finished state of the hard copy. As a result, it is possible to improve operativity.

According to the eighth aspect of the present invention, it is possible to positively confirm the preview of document images on both sides.

According to the ninth aspect of the present invention, it is possible for the user to confirm the finished state of a hard copy in a similar feeling as if the user is turning pages of the actual hard copy.

According to the tenth aspect of the present invention, the user can easily recognize the side of the hard copy, either the front or rear side when confirming the preview display.

According to the eleventh aspect of the present invention, it is possible to display the bound condition of the hard copy and allow the user ease of recognition, hence the user can easily grasp and confirm the page position of the image of the page to be turned. Further, displaying the bound position in the hard copy makes it possible for the user to grasp and confirm the side of the image of the page to be turned, either the front or rear side, which is being displayed.

BRIEF DESCRIPTION OF THE DRAWINGS

FIGS. 17a to 17f are illustrative views showing the control of confirming the finished state of a "dual-sided top bound" hard copy, through the preview representation on the display panel;

FIGS. 18a to 18h are illustrative views showing the states of making the transition of rotating the front side of a sheet to the rear side in a "dual-sided top bound" hard copy displayed in preview on the display panel;

DETAILED DESCRIPTION OF THE INVENTION

The First Embodiment

The first embodiment of the present invention will hereinafter be described with reference to the accompanying drawings.

Figure 1:
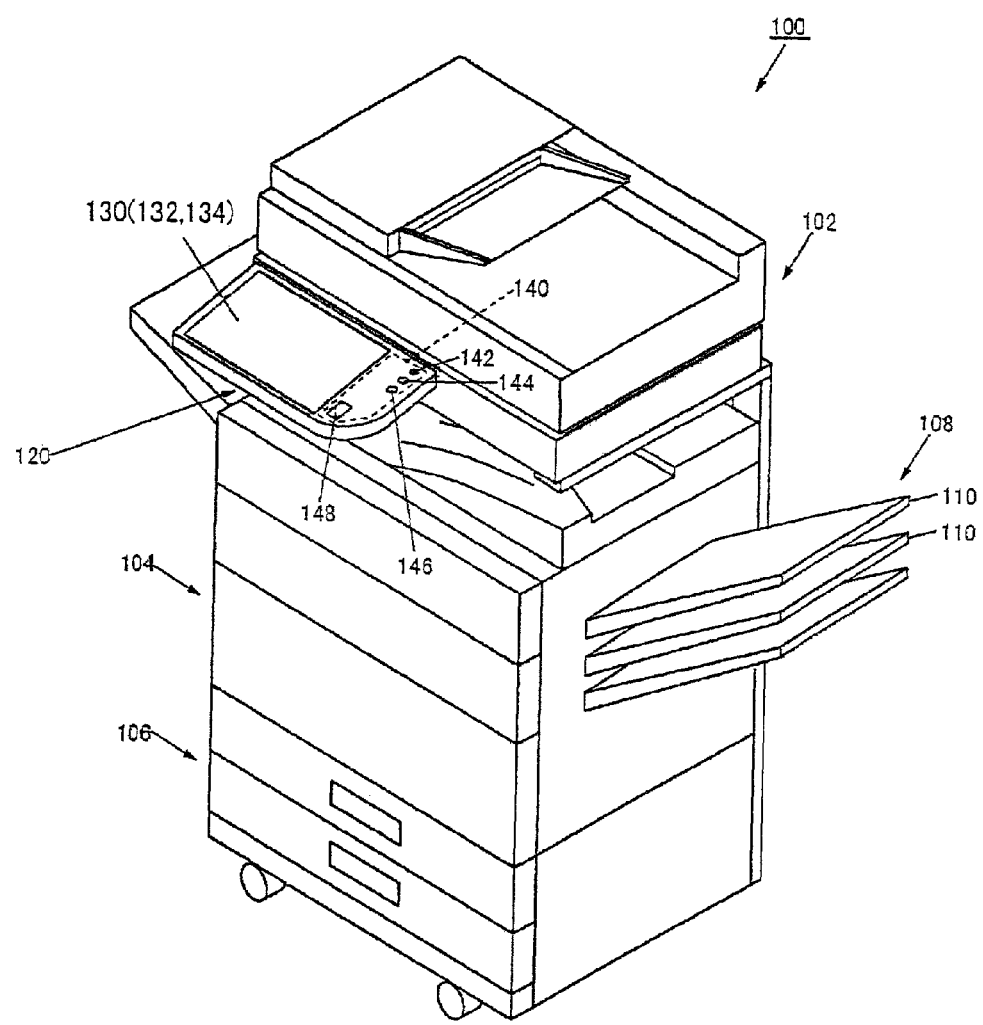
FIG. 1 is an illustrative view showing an overall configuration of an image forming apparatus according to the first embodiment of the present invention.
Figure 2:
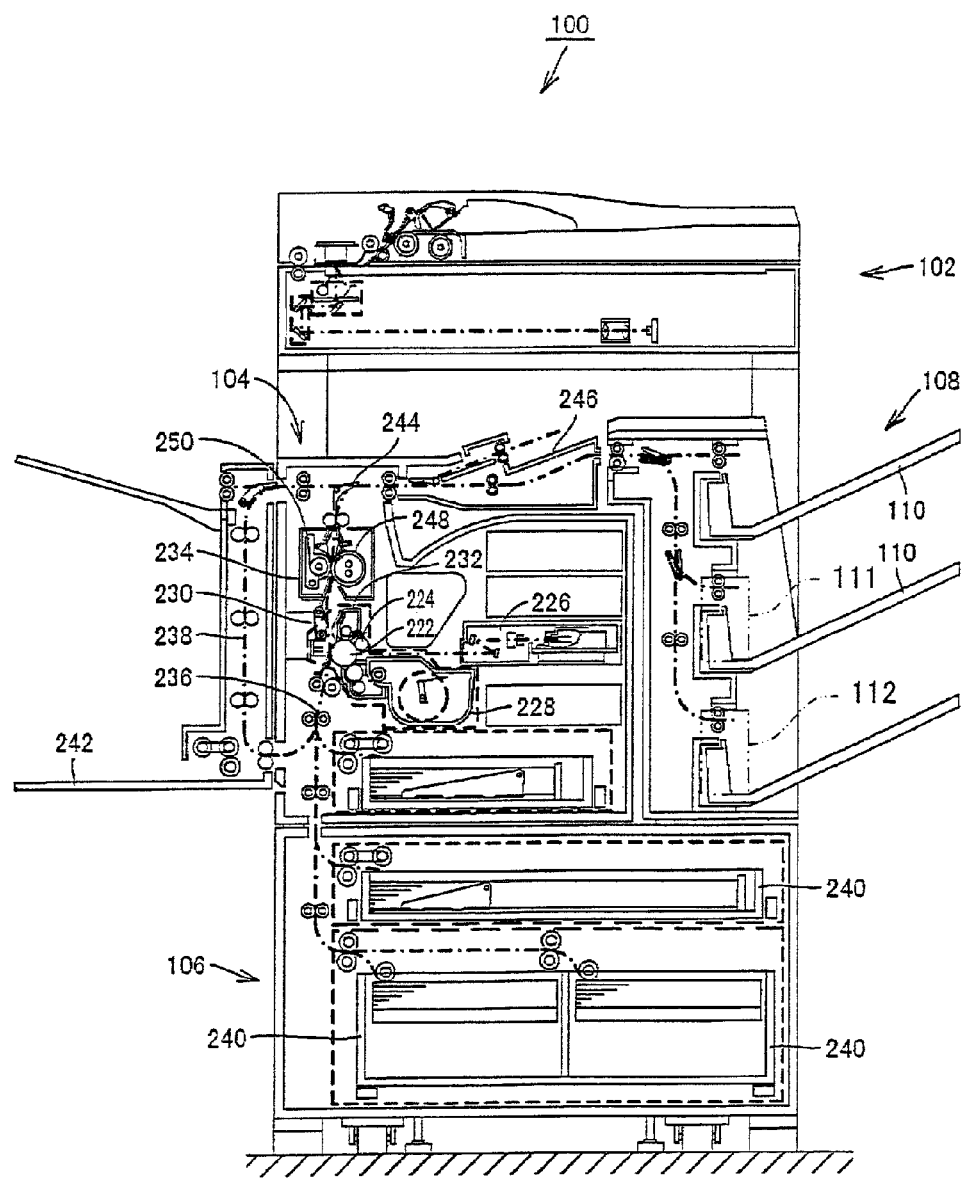
FIG. 2 is an illustrative view schematically showing the internal mechanisms of the image forming apparatus.
Figure 3:
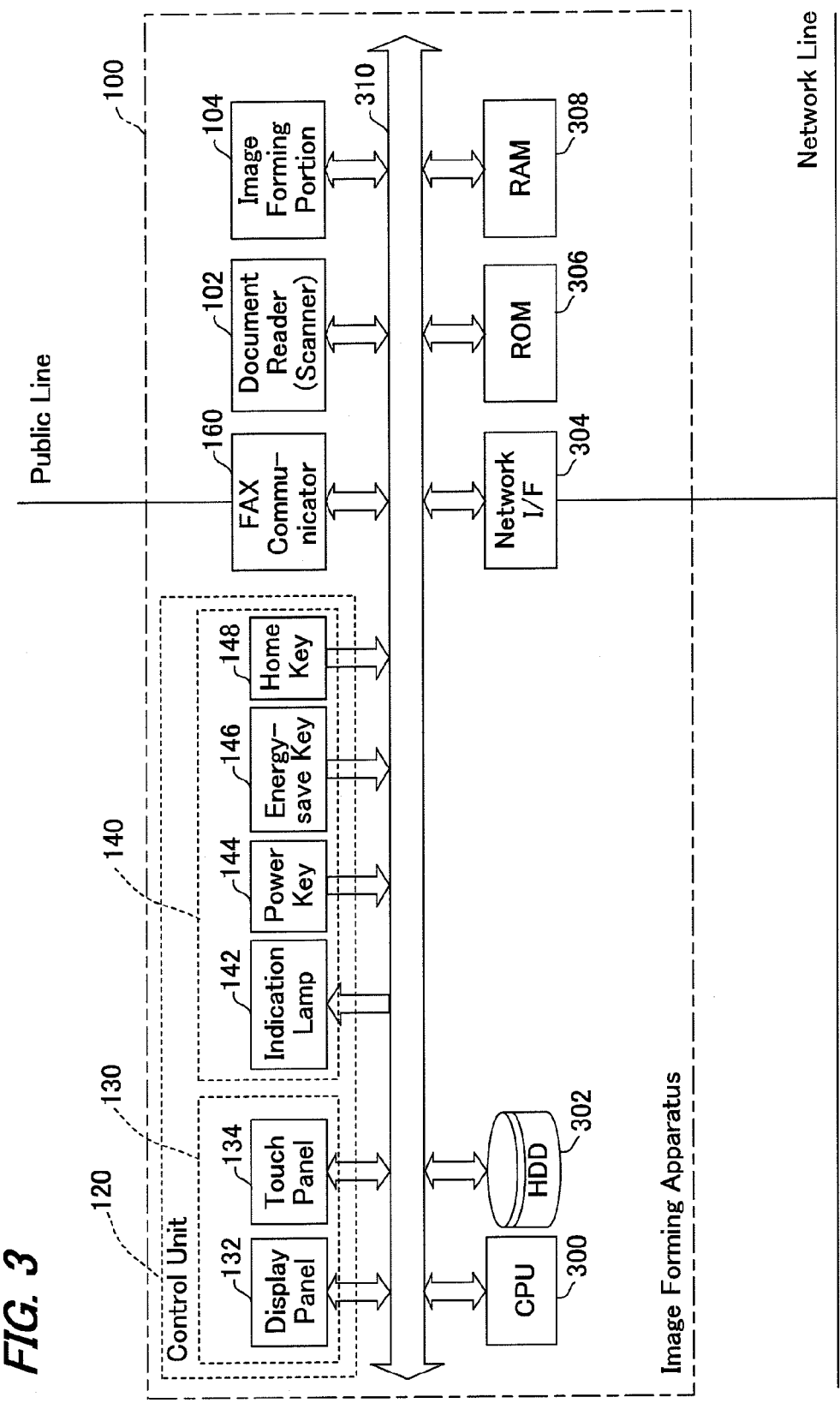
FIG. 3 is a functional block diagram showing a hardware configuration of the image forming apparatus.
Figure 4:
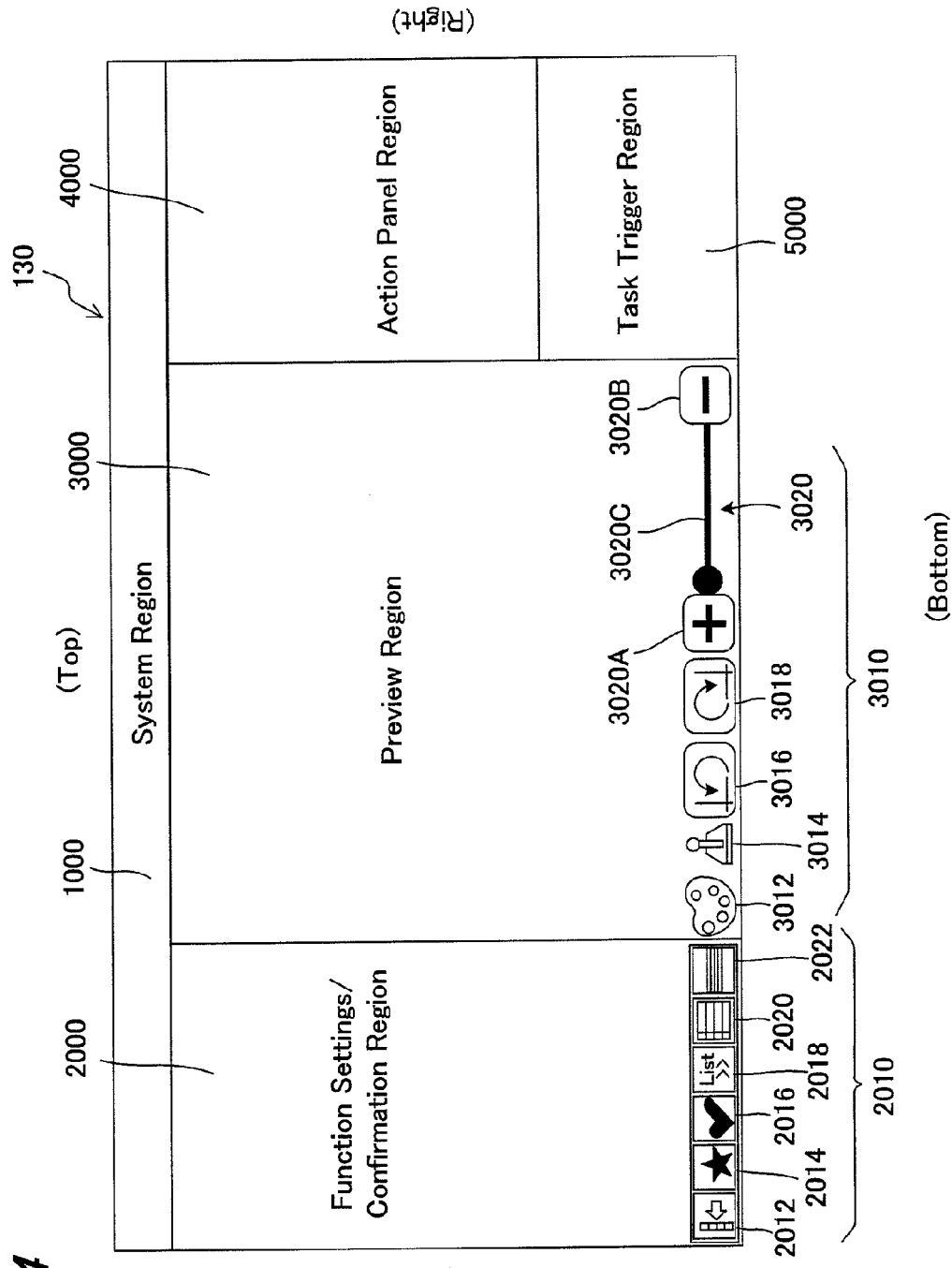
FIG. 4 is an illustrative view showing a preview display region on a touch panel display of the image forming apparatus.
Figure 5:
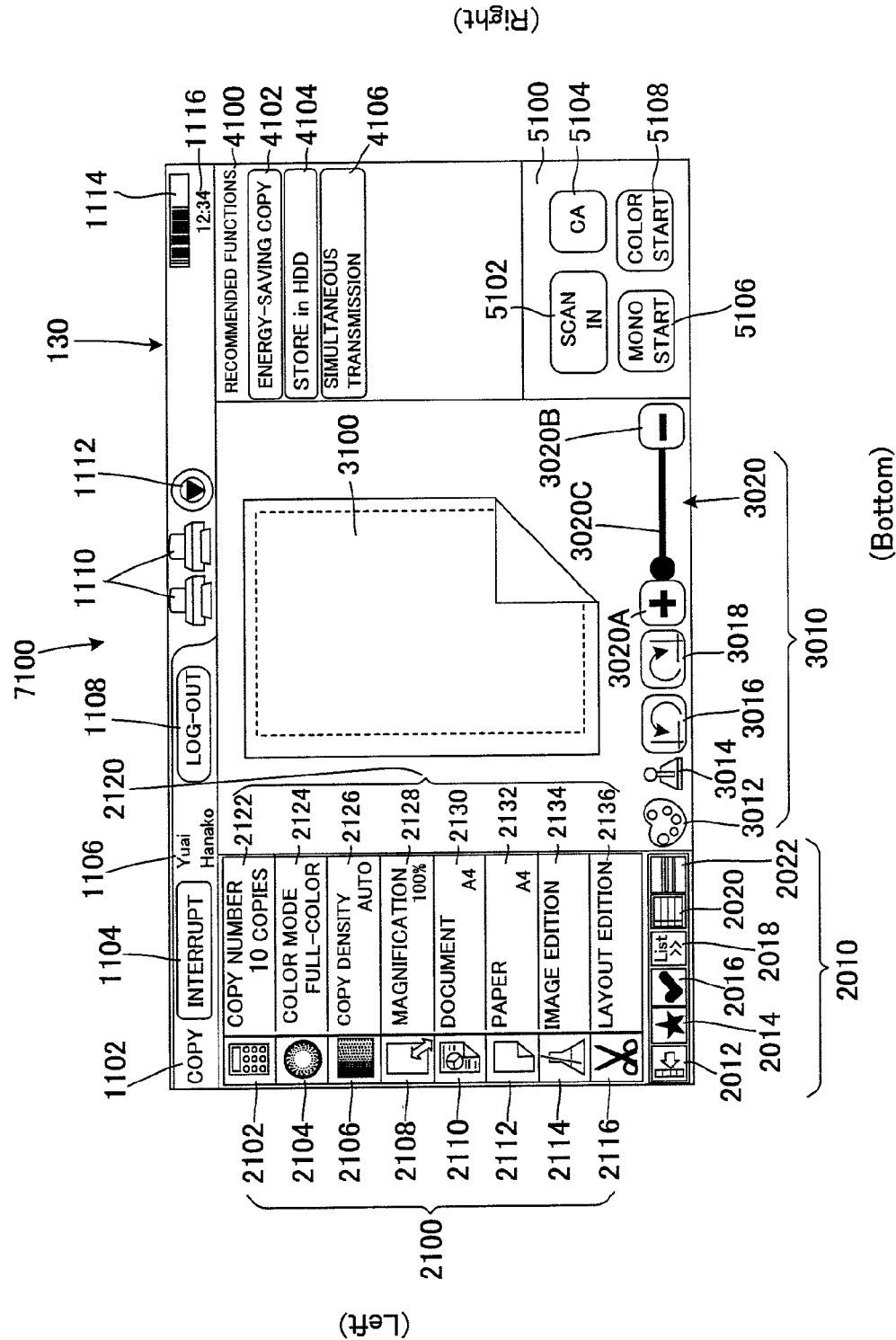
FIG. 5 is an illustrative view showing a screen example displayed on the touch panel display.
Figure 6:
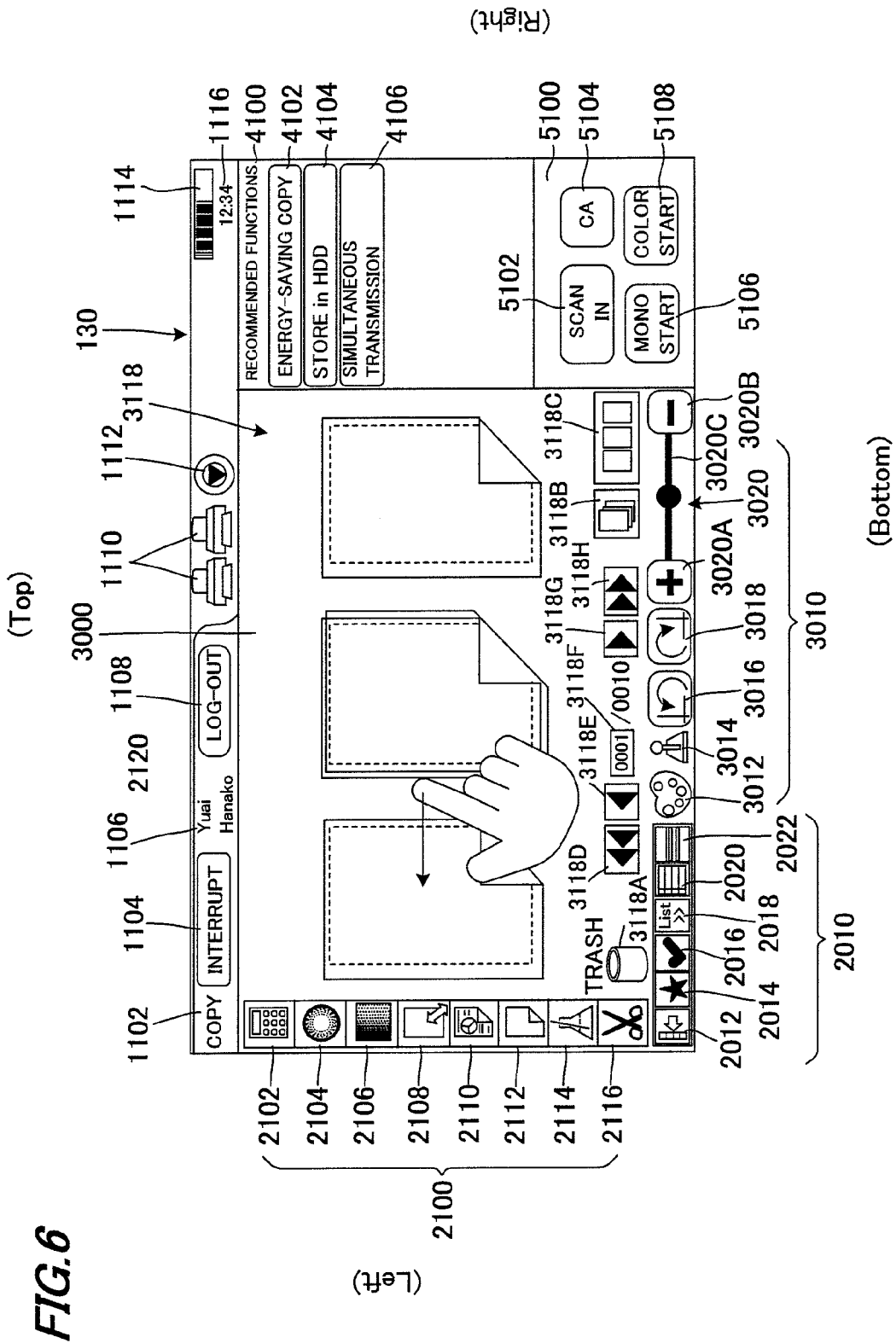
FIG. 6 is an illustrative view showing a state where the preview region being displayed on the touch panel display is modified.

FIG. 1 is an illustrative view of one example mode of carrying out the present invention, showing an overall configuration of an image forming apparatus according to the first embodiment of the present invention. FIG. 2 is an illustrative view schematically showing the internal mechanisms of the image forming apparatus. FIG. 3 is a functional block diagram showing a hardware configuration of the image forming apparatus. FIG. 4 is an illustrative view showing a preview display region on a touch panel display of the image forming apparatus. FIG. 5 is an illustrative view showing a screen example displayed on the touch panel display. FIG. 6 is an illustrative view showing a state where the preview region being displayed on the touch panel display is modified.

An image forming apparatus 100 according to the first embodiment of the present invention includes, as shown in FIG. 1, includes: a document reader (input unit) 102 for capturing image data; an image forming portion 104 for forming an image on a recording medium based on the image data input through document reader 102; and a control unit (image display operating device) 120 having a display panel (display portion) 132 for displaying preview images based on image data and a touch panel display (display controller) 130 having the function of making preview representation of multiple pages of document images on display panel 132. The image forming apparatus 100 may be equipped with a post-processing apparatus for finishing recording mediums with images formed thereon by image forming portion 104 into a hard copy.

The multiple document images displayed on display panel 132 may include preview display images of document images captured by the document reader etc., of image forming apparatus 100 and finished preview images of images formed on recording paper by the image forming portion.

Image forming apparatus 100 is a kind of an image processing apparatus. The image display operating device according to the present invention is also applicable to image processing apparatus and electronic appliances other than the image forming apparatus of this kind.

Further, image forming apparatus 100 includes a plurality of operational modes, and is equipped with a display device for displaying information for each operational mode. The display device is preferably constructed so as to be able to display information the user wants in a user friendly manner even if the user does not remember the screen configuration when the operational mode is changed over.

Here, image forming apparatus 100 includes a touch panel display (control screen) that can be controlled by both gesture control and touch control other than gesture control, but the image forming apparatus may use a touch panel display that can be controlled by touch control only. Alternatively, the image forming apparatus may include a display panel that cannot be touch-controlled but can display only, with keys for control.

Here, gesture control means controls that are related to various kinds of movements of fingers in combination with GUI (Graphic User Interface), such as responses in accordance with the distance moved and speed of the fingers, double-tapping, the moving fingers trace and the like that are given with meanings.

This image forming apparatus 100 forms images on recording paper based on electrophotography.

Image forming apparatus 100 includes, as its operation modes, copy mode, facsimile mode (FAX mode), document filing mode (a mode in which scanned images are stored in a storage inside the image forming apparatus) and mail mode (a mode in which scanned images are transmitted in the form of an attachment file to an e-mail). This image forming apparatus 100 may further have a network printer mode.

The image forming apparatus 100 changes the display content on the screen every time the operation mode is switched. Further, the printing mechanism is not limited to electrophotography.

To begin with, image forming apparatus 100 will be described.

Image forming apparatus 100 includes a document reader 102, an image forming portion 104, a paper feed portion 106, a paper output processor 108 and a control unit 120.

Control unit 120 is formed of a touch panel display 130 and a display control portion 140. Touch panel display 130 is comprised of a display panel 132 of a liquid crystal panel or the like and a touch panel (touch control detecting means) 134 that is laid over display panel 132 to detect the positions the user presses with fingers. Display control portion 140 includes an indication lamp 142, a power key 144, an energy-save key 146 and a home key 148 that resets the display content of touch panel display 130 to the home screen for operational mode selection.

In this way, image forming apparatus 100 has touch panel display 130 as a main control device and also has a display control portion 140 that includes the hardware keys and indication lamps. The keys (power key 144, energy-save key 146 and home key 148) on display control portion 140 are given as hardware buttons, in contrast to software buttons formed by touch panel display 130.

Note that image forming apparatus 100 should not be limited to that including display control portion 140 of this kind, but may be provided with touch panel display 130 only. That is, it will work as long as the initial screen of the selected operational mode can be actuated when the user selects an operational mode on the home screen displayed on touch panel display 130. Next, the operational modes of this image forming apparatus 100 will be described.

(Copy Mode)

The operation of the copy mode of image forming apparatus 100 will be described.

In this copy mode, image reader (which will be referred to hereinbelow as "scanner") 102 and image forming portion 104 operate mainly.

A document placed on a document placement table is read as image data by scanner 102 and the read image data is input to a CPU 300 of a microcomputer etc. shown in FIG. 3, where the image data undergoes various kinds of image processing, and the processed image data is output to image forming portion 104.

As shown in FIG. 2, image forming portion 104 is a mechanism that prints images of documents given as image data onto recording mediums (recording paper in most cases), including a photoreceptor drum 222, a charging device 224, a laser scan unit (which will be referred to hereinbelow as "LSU") 226, a developing device 228, a transfer device 230, a cleaning unit 232, a fixing unit 234, an unillustrated charge eraser and other devices.

Also, image forming portion 104 is provided with a main feed path 236 and a reverse feed path 238. The recording paper fed from paper feed portion 106 is conveyed along main feed path 236. Paper feed portion 106 draws recording paper, one sheet at a time, from a stack of recording paper, held in a paper feed cassette 240 or set on a manual feed tray 242 and delivers the recoding paper to main feed path 236 of image forming portion 104.

In the course of the recording paper being conveyed along main feed path 236 of image forming portion 104, the recording paper passes through and between photoreceptor drum 222 and transfer device 230 and then passes through fixing device 234 to perform printing for the recording paper.

While photoreceptor drum 222 rotates in one direction, its surface is cleaned by cleaning device 232 and the charge erasing device, then uniformly electrified by charging device 224.

LSU 226 modulates the laser beam based on the image data to be printed and repeatedly scans the laser beam over the photoreceptor drum 222 surface in the main scan direction, to form an electrostatic latent image on the photoreceptor drum 222 surface.

Developing unit 228 supplies toner to the photoreceptor drum 222 surface and develops the electrostatic latent image to form a toner image on the photoreceptor drum 222 surface.

Transfer device 230 transfers the toner image on the photoreceptor drum 222 surface to the recording paper which passes through the nip between the transfer device 230 and photoreceptor drum 222.

Fixing device 234 includes a heat roller 248 for heating recording paper and a pressing roller 250 for pressing recording paper. The recording paper is heated by heat roller 248 and pressed by pressing roller 250 so that the toner image transferred to the recording paper is fixed to the recording paper. A heater in the heat roller is heated by the power supplied to this fixing unit 234 so as to control and keep heat roller 248 at a temperature suitable for fixing. When the apparatus enters the energy saving mode, for instance the power supplied to this heater is stopped or cut down.

Arranged at the junction between main feed path 236 and reverse feed path 238 is a branch claw 244. When printing is performed on one side of recording paper only, branch claw 244 is positioned so as to lead the recording paper from fixing device 234 toward a paper output tray 246 or paper output processor 108.

When printing is performed on both sides of recording paper, branch claw 244 is rotated in the predetermined direction so that the recording paper is once conveyed toward the paper output tray 246 side. Then, the paper is switched back and conveyed toward reverse feed path 238. The recording paper then passes through reverse feed path 238 and is inverted upside down and fed to main feed path 236 again. The recording paper is once again printed on its rear side in the course of main feed path 236 and lead to paper output tray 246 or paper output processor 108.

The recording paper thus printed is lead to paper output tray 246 or paper output processor 108 and discharged to either paper output tray 246 or each of paper output trays 110 of paper output processor 108.

In paper output processor 108, a plurality of recording sheets are sorted and discharged to individual paper output trays 110, and/or each set of recording sheets is punched or stapled. For example, when multiple copies of printed documents are prepared, the printed recording sheets are sorted and discharged to paper output trays 110 so that one copy of the printed documents is allotted to individual paper output tray 110, and the printed documents on each paper output tray 110 are punched by a punching unit 111 or stapled by a stapling unit 112 to prepare individual printed material.

(Facsimile Mode)

Next, the operation in facsimile mode will be described.

In this facsimile mode, the transmitting operation is mainly effected by document reader (scanner) 102 and a FAX communicator 160, as shown in FIG. 3. The receiving operation is mainly effected by FAX communicator 160 and image forming portion 104.

(Transmitting Operation)

The transmitting operation is performed by the steps of: selecting the facsimile mode, reading image data from a document placed on the document placement table by means of document reader 102, supplying the read image data to CPU 300 made up of a microcomputer etc. shown in FIG. 3 where the image data is subjected to various kinds of image processes, and outputting the thus obtained image data to the FAX communicator (FAX communicator 160 in FIG. 3).

As shown in FIG. 3, FAX communicator 160 of the transmission side image forming apparatus 100 connects the selected transmitter side line to the designated destination, converts the image data into communication data conforming to the facsimile communication standard and transmits the communication data to the receiver side facsimile machine (e.g., image forming apparatus 100 having a facsimile function).

(Communication Operation)

When connection of the line is established, FAX communicator 160 of image forming apparatus 100 on the receiver side detects a communication request signal from FAX communicator 160 of image forming apparatus 100 on the transmitter side and sends a response signal. Then, for example, FAX communicators 160 on both the transmitter and receiver sides exchange facsimile performance information of their own with each other and determine the communication within the available maximum capacity to set up a modem communication scheme. The data is transmitted based on the determined communication scheme, from FAX communicator 160 of image forming apparatus 100 on the transmitter side to FAX communicator 160 of image forming apparatus 100 on the receiver side. When data transmission is ended, the line is cut off.

(Receiving Operation)

The FAX communicator 160 of image forming apparatus 100 on the receiver side converts the received data into image data and sends the data to image forming portion 104. Here, the received data may be converted into image data by image forming portion 104. Image forming portion 104 prints images of documents represented by the image data converted from the received data, onto recording paper, in the same manner as the above-described operation in copy mode.

Next, the control block configuration of image forming apparatus 100 will be described with reference to the drawings.

As shown in FIG. 3, image forming apparatus 100 includes: control unit 120 that allows the user to set copy mode and facsimile mode; a ROM 306 for storing programs etc.; a hard disk 302 serving as a non-volatile storage area that can hold programs, data and the like even if the power is cut off; and a RAM (Random Access Memory) 308 that offers a storing area when a program is executed.

Image forming apparatus 100 further includes: a bus 310 connected to image reader 102, image forming portion 104, FAX communicator 160, control unit 120, ROM 306, hard disk 302 and RAM 308; and CPU 300 that is connected to bus 310 to realize general functions as an image forming apparatus.

Hard disk 302 records (stores) files of image data of documents scanned by the image forming apparatus 100. Hard disk 302 also stores initial screen data for each operational mode. The files and data stored in hard disk 302 can also be recorded in ROM 306.

Stored in ROM 306 are programs, data and the like necessary for controlling the operation of image forming apparatus 100. As the data stored in ROM 306 with the programs, the initial screen data for each operational mode may be stored. CPU 300 controls image forming apparatus 100 in accordance with the programs and data stored in ROM 306 and performs control associated with each function of image forming apparatus 100.

As shown in FIG. 3, a public line for exchange of image data is connected to FAX communicator 160 of this image forming apparatus 100 while a network line is connected to a network interface 304. This network line may be connected to a computers etc. that use this image forming portion 100 as a network printer or may be connected via the Internet to a computer etc. that is identified by a designated URL (Uniform Resource Locator). When connected to the Internet in this way, the image forming apparatus 100 can obtain the necessary information via the Internet.

RAM 308 offers a function as a working memory for temporarily recording the result of the operation and processing by CPU 300 and a function as a frame memory for recording image data.

Control of image reader 102, image forming portion 104, touch panel display 130 and display control portion 140 forming control unit 120, ROM 306, hard disk 302 and RAM 308 is performed by CPU 300 executing predetermined programs. Here, control unit 120 communicates with CPU 300 by way of an input/output interface.

Control unit 120 is given as a board-like panel that is tilted so as to allow the user ease of view. Control unit 120 includes touch panel display 130 in the left area and display control portion 140 (including indication lamp 142 and hardware buttons, namely, power key 144, energy-save key 146 and home key 148) in the right area on the top thereof Touch panel display 130 and display control portion 140 are integrally provided in control unit 120.

As described above, this touch panel display 130 is formed of display panel 132 and touch panel 134 that is laid over display panel 132.

Displayed on touch panel display 130 are the home screen for selection of the operational mode of image forming apparatus 100, the current status of this image forming apparatus 100, the status of destination selection, job processing status and the like.

Displayed in the preview display area of display panel 132 are selection buttons as software keys. When the displayed area of a selection button is pushed by a finger, touch panel 134 detects the pushed position. Then, the position on which touch panel 134 is pressed is compared with the positions of selection buttons so as to perform selection of an operational mode of image forming apparatus 100, functional setting, operational instructions, and the like. In addition to this touch control (command input control based on the position of the user's pressing), this image forming apparatus 100 also supports the above-mentioned gesture control (command input control based on the trace of user's control motion).

Further, indication lamp 142 of display control portion 140 is made up of a LED (Light Emitting Diode) for instance and is controlled by CPU 300 so as to turn on/off (/flash on and off). When the user presses down power key 144 that is provided separately in addition to the main power switch, this image forming apparatus 100 comes out of standby mode (in which, for example, only fax reception is permitted with the main power turned on) to active mode so that the whole operational modes of this image forming apparatus 100 can be used. Indication lamp 142 comes on in link with this status. Further, when a predetermined period has elapsed without receiving any user input, or when the user presses energy-save key 146, this image forming apparatus 100 comes out of active mode into energy save mode so that only part of the operational modes of image forming apparatus 100 are operational. Indication lamp 142 flashes on and off in link with this status. Further, when the user presses energy-save key 146 in this energy save mode, the image forming apparatus 100 comes out of energy save mode into active mode. Home key 148 is a hardware key for retuning the display of touch panel display 130 into the initial condition (home screen). It is noted that the operations when power key 144, energy-save key 146 and home key 148 are pressed should not be limited to these.

The hardware keys on display control portion 140 (power key 144, energy-save key 146 and home key 148) may be embedded with a key lamp controlled by CPU 300 so as to turn on/off (/flash). For example, this key lamp may be a round type key ring-like lighting or center lighting. This key lamp turns on at the timing that the hardware key is permitted to use as a control device (at the timing that operation is performed when the hardware key is used).

Image forming apparatus 100 has the aforementioned two operational modes (copy mode and facsimile mode). Software buttons for function settings in each operational mode are displayed on touch panel display 130, and also the preview as the on-screen form of forming images, keys for destination setting and the like are displayed as necessary.

When the operational mode is different from that which the user wants, touch panel display 130 displays another screen. Even in such a case, in order for the user to easily find the information the user requests, touch panel display 130 is divided into multiple regions (which also are given in a size variable manner) so as to display necessary information in each region.

In particular, in this image forming apparatus 100, when one operational mode is selected on the home screen of touch panel display 130 provided as the main display control device, the initial screen of the operational mode is displayed.

In this initial screen, (1) the basic layout is formed of five areas, namely "system region", "function selecting region", "preview region", "action panel region" and "task trigger region", which are appropriately arranged, so that the user is able to easily perform input of settings from top left to bottom right (in the same manner as the user moves their gaze and fingers in the conventional machine which is not provided with a large scale touch panel display 130). Further, (2) the concept of the displays of the five regions is consistent in all operational modes, so that the user is able to operate without confusion when another operational mode is used. The following description will be given on the configuration of the basic layout.

The basic layout in touch panel display 130 will be described with reference to the drawings.

As shown in FIG. 4, the basic layout of touch panel display 130 is designed in the laterally long touch panel display 130 such that a system region 1000 is arranged at the topmost part, a preview region (preview display region) 3000 in the center of the screen, a function settings/confirmation region 2000 on the left side of preview region 3000, an action panel region 4000 on the upper right part of preview region 3000, and a task trigger region 5000 on the lower right of preview region 3000. Here, the laterally long touch panel display 130 is formed of, for example, 1024 pixels wide×600 pixels high. Further, function settings/confirmation region 2000 will be written hereinbelow as function selecting region 2000.

It is noted that the number of regions in touch panel display 130 should not be limited to five. Also, the horizontal arrangement should not be limited so that the horizontal arrangement may be reversed right side left, for example, depending on the user's dominant hand. Further, the position of system region 1000 may be disposed at the lowermost part. Alternatively, the system region 1000 may be undisplayed depending on the status or settings.

System region 1000 displays the current status of this image forming apparatus 100, e.g., the title of the operational mode in control and the status and conditions of image forming apparatus 100. For example, displayed in system region 1000 are the name of operational mode, the cut-in key, the log-in user name, the job status in progress, the usage status of built-in memory, time and the like.

In function selecting region 2000, settings in each function, display switching, function selecting menu (icons, buttons, etc.) operated by user to confirm settings are variably displayed in a selected display style, i.e., in icon mode, regular mode or express mode. In icon mode, only icons for function setting are displayed in function selecting region 2000 so as to maximize the size of preview region 3000. In express mode, the display of function selecting region 2000 is enlarged so as to allow the user to set the function all at once though the size of preview region 3000 is minimized. In regular mode, preview region 3000 is sized between that in the icon mode and that in the express mode while in function selecting region 2000 the text of function titles are displayed together with functional setting icons.

These icon mode, regular mode and express mode are switched from one to another based on user control. That is, the size of preview region 3000 is modified and displayed in accordance with user control. In this way, since icons are able to give information to the user by using limited area, it is preferable that every function is given with an icon so as to be able to enlarge the display of preview region 3000.

This function selecting region 2000 includes at its bottom a group of select buttons 2010 for switching the display style in function selecting region 2000. Arranged in the group of select buttons 2010 are an icon mode entering button 2012 for displaying function selecting region 2000 in icon mode, a favorite button 2014 for displaying the functions registered as "favorites", a check button 2016 for displaying the functions whose settings have been modified, a list button 2018 for displaying a list of all the functions that can be designated in the selected operation mode, a regular mode entering button 2020 for displaying function selecting region 2000 in regular mode, and an express mode entering button 2022 for displaying function selecting region 2000 in express mode.

Here, when there are many pieces of information to be displayed in function selecting region 2000, the information is displayed in this function selecting region 2000, in a vertically scrolling manner. In this case, this group of select buttons 2010 is not scrolled but constantly displayed in the bottom-most portion of function selecting region 2000.

Preview region 3000 displays the image of the output pages of the (finished) document. The image is displayed using dummy data or scanned data, and the displayed image in preview region 3000 is revised every time the user changes the finish. There are two modes of displaying the finish in this preview region 3000: the display of the final preview with a dummy image in virtual mode before scanning and the display of the final preview with actual images in scan-in mode after scanning. The virtual mode further has two types, before setting documents and after setting documents.

At the bottom of this preview region 3000 there is a group of preview select buttons 3010 for changing the display style in preview region 3000. The group of preview select buttons 3010 includes a rotate-left button 3016 for rotating the image left 90 degrees and a rotate-right button 3018 for rotating the image right 90 degrees and a zoom bar 3020. Other than these, for example a change color button 3012 and preview control button 3014 are arranged.

With this, when rotate-left button 3016 is touched once, the preview rotates 90 degrees left. When the button is touched twice, the preview is rotated 180 degrees left (inverted upside down). Alternatively, when the image of the finished document displayed in the preview region is gesture-controlled (by rotating the document image 180 degrees counterclockwise with the fingertip), the preview is rotated 180 degrees left or inverted upside down.

When rotate-right button 3018 is touched once, the preview rotates 90 degrees right. When the button is touched twice, the preview is rotated 180 degrees right (inverted upside down). Alternatively, when the image of the finished document displayed in the preview region is gesture-controlled (by rotating the document image 180 degrees clockwise with the fingertip), the preview is rotated 180 degrees right or inverted upside down.

When the (+) button 3020A of zoom bar 3020 is touched, or when bar 3020C is gesture-controlled (by the "drag or flick" gesture) toward the (+) button 3020A, the preview image is enlarged. Alternatively, when the image of the finished document displayed in the preview region is gesture-controlled (on the document image by the "pinch out/pinch open" gesture with fingertips), the preview image is enlarged. Here, the "drag" gesture is an action of moving the finger. The "flick" gesture is a swiping action of the finger. The "pinch out/pinch open" is an action of spreading the two fingertips apart.

When the (−) button 3020B of zoom bar 3020 is touched, or when bar 3020C is gesture-controlled (by the "dragging or sliding" gesture) toward the (−) button 3020B, the preview image is reduced. Alternatively, when the image of the finished document displayed in the preview region is gesture-controlled (on the document image by the "pinch in/pinch close" gesture with fingertips), the preview image is reduced. Here, the "pinch in/pinch close" is an action of bringing the two fingertips together.

When there are many pages of document images to be displayed in preview region 3000, touchable displayed page select buttons (page number input buttons, page up and down buttons, single page display button and multiple page display button, etc.) may be displayed. In this case, it is also possible to turn over or return the page of the document to be previewed by a sliding touch (flicking) of the document image. Further, when the document image to be displayed in preview region 3000 is large, scroll bars that can be touched or gesture-controlled may be displayed.

Action panel region 4000 displays information such as hint, advice and suggestion for operation and control. Display in this action panel region 4000 is given such that when a particular function is selected by a certain user, the functions associated with the subject function may be displayed, another function as to the subject function may be displayed in a purpose-oriented manner, or the function that was selected in the past in combination with the subject function by the same user or a user of the group to which this user belongs may be displayed as a "recommended function".

Task trigger region 5000 displays trigger items that the user operates in order to actually cause the image forming apparatus 100 to operate after all the settings in the operational mode have been completed. An example is the start button (software button) for starting the operation. Here, since information on a lack of a consumable supply is also related to the unfeasibility of the task in the operational modes needing a printing process (other than fax transmission), this should be also displayed in this "task trigger region".

In this case, it is also preferable that the start button is displayed only when the start button can be pressed down. The condition in which the start button can be pressed down, means a state where all settings have been completed and none of consumable supplies (recording paper and toner) will run short in the case of an operational mode needing a printing operation or a state where all the transmission parameters including destination have been set in the case of a fax mode (transmission) operation as the operational mode needing no printing.

The layout of these five regions is not changed even if the operational mode is switched from one to another (in the initial screen of any operational mode). Further, each region may change in size, expanding or contracting in the horizontal (longitudinal) direction of the screen of touch panel display 130 as in the case where the display of function selecting region 2000 (and preview region 3000) is switched between icon mode, regular mode and express mode.

The layout of the five regions is designed in light of the user interfaces in conventional machines, by directing attention to user's path of gaze and control. This arrangement leads the user to perform settings by moving their gaze from top left to bottom right and moving their input action (fingers of the dominant hand) from top left to bottom right.

In this arrangement, for switching the operational mode from one to another, the user presses down home key 148 (FIG. 3) and selects another operational mode on the home screen. In this way, it is possible to change operational mode by way of the home screen.

(Initial Screen Display Operation in Copy Mode)

When copy mode is selected, the initial screen for copy mode is displayed on touch panel display 130 using copy mode initial screen data loaded from hard disk 302 (FIG. 3) or the like.

In this occasion, a copy mode initial screen 7100 is displayed for example, on touch panel display 130, as shown in FIG. 5. Copy mode initial screen 7100 displays information using the five divided regions laid out as described above.

In system region 1000 (FIG. 4) of copy mode initial screen 7100, areas 1102, 1104, 1106, 1108, 1110, 1112, 1114 and 1116 are laid out as shown in FIG. 5.

Area 1102 denotes the operational mode being selected (copy mode in this case). Displayed in area 1102 is the name and/or icon of the operational mode.

It is also preferred that a pulldown menu showing operational modes is displayed so as to allow for switching of operational mode when this area 1102 is touch-controlled, tapped or double-tapped (the same in other operational modes).

Area 1104 displays sub information entailing the selected operational mode.

In area 1104 a cut-in key (software button) is displayed as sub information. When this cut-in key is touch-controlled, tapped or double-tapped, a cut-in process can be actuated in copy mode.

Area 1106 displays the log-in user name.

In area 1108 a log-out button (software button) is displayed.

Area 1110 displays the status of the job in progress.

Area 1112 displays buttons (software buttons) related to job status.

That is, area 1112 displays the status of the job in progress with an icon. As this job status is touch-controlled, tapped or double-tapped, the job status information is displayed in detail. It is further preferable that a button for suspending the selected job and the like is displayed in area 1112.

Area 1114 displays the communication status and area 1116 displays the current time.

Displayed in function selecting region 2000 (FIG. 4) on copy mode initial screen 7100 are a function selecting menu 2100 that allows the user to select in copy mode and a group of select buttons 2010 described above. In the screen shown in FIG. 5, the function select menu is displayed in regular mode.

As shown in FIG. 5, the function select menu displayed in regular mode is composed of a group of icons 2100 and a group of texts 2120.

As the function select menu displayed in function selecting region 2000, texts 2122, 2124, 2126, 2128, 2130, 2132, 2134 and 2136 are displayed.

Text 2122 shows an icon 2102 for setting the number of copies and its set content.

Text 2124 shows an icon 2104 for setting color mode and its set content.

Text 2126 shows an icon 2106 for setting copy density and its set content.

Text 2128 shows an icon 2108 for setting copy magnification and its set content.

Text 2130 shows an icon 2110 for setting the document type and its set content.

Text 2132 shows an icon 2112 for setting the paper type and its set content.

Text 2134 shows an icon 2114 for image edition and its set content.

Text 2136 shows an icon 2116 for layout edition and its set content.

Here, it should be noted that a greater number of items can be also displayed in the function setting menu, in a vertically scrolling manner with the position of select buttons 2010 fixed. In this case, the displayed items inclusive of hidden items above and below, can be changed from one to another by any of touch control (scroll control) and gesture control (flick control in the vertical direction).

Here, the image edition is edition for one page document, and includes, as a lower-layered menu, frame deletion, printing menu, watermark, user stamp and the like. The layout edition is edition for multiple pages of documents, and includes, as a lower-layered menu, page integration, binding margins, page change, centering and the like. Subordinates menus under these will be displayed on touch panel display 130 by touching, tapping or double-tapping icons 2102 to 2116 or texts 2112 to 2136.

Arranged in preview region 3000 (FIG. 4) on copy mode initial screen 7100 are a document output (finish) image 3100 and a group of preview select buttons 3010 stated above. In this arrangement, dummy data or scanned data is used to display image 3100, and the image 3100 is changed and displayed in preview region 3000 every time the function setting menu in function selecting region 2000 is changed (the preview display is changed).

Displayed in action panel region 4000 (FIG. 4) on copy mode initial screen 7100 is information such as hint, advice and suggestion for copying operation. Here, recommended functions in the copy mode that the user selects are displayed as shown in FIG. 5. In this case, action panel region 4000 includes an area 4100 for displaying the content of displayed information and areas 4102 to 4106 that serve in themselves as software buttons and display text indicating recommended functions.

When area 4102 is touch-controlled, tapped or double-tapped, a pulldown menu of further detailed information for energy-saving in copying is displayed. In this case, for example a software button for entering the function setting screen for duplex copying is displayed with text "Duplex printing will save paper", a software button for entering the function setting screen for page integration with text "Printing multiple documents integrally will save paper", and a software button for entering the function setting screen for saddle stitch binding with text "Printing can be done so as to bind the paper as a booklet".

Displayed in task trigger region 5000 (FIG. 4) on copy mode initial screen 7100 is a group of command buttons 5100. These command buttons 5100 include a scan-in key (software button) 5102, a clear-all key (software button) 5104, a monochrome start key (software button) 5106 and a color start key (software button) 5108.

Scan-in key 5102 is a key for causing image forming apparatus 100 to scan a document to obtain image data.

Clear-all key 5104 is a key for clearing the set functions.

Monochrome start key 5106 is a key for causing image forming apparatus 100 to scan a document and perform monochrome copying.

Color start key 5108 is a key for causing image forming apparatus 100 to scan a document and perform color copying.

In this way, when the user inputs a request in copy mode initial screen 7100 displayed with information in five-divided regions, a copying process is effected in accordance with the request.

Next, description will be made on the switching operation of preview pages when preview region 3000 (FIG. 4) is enlarged with function selecting region 2000 (FIG. 4) displayed in icon mode.

When the user flicks left the preview display screen in which a preview image 3118 is displayed as shown in FIG. 6, the input trace is analyzed. In this case, the gesture control by this user is analyzed as a request for turning over the page, and a revised preview image including another page that has not been displayed and corresponds to the direction of the flick is displayed.

It is also possible to change the pages in preview image representation by touching a page forward button 3118G, page fast forward button 3118H, page reverse button 3118E or page fast reverse button 3118D. It is also possible to change the pages in preview image representation by touching a direct pagination button 3118F to directly input the page number the user wants to jump.

In this way, when function selecting region 2000 is displayed in icon mode, preview region 3000 is enlarged so that it is possible to display the preview image so as to improve user' visual recognition and user controllability, as shown in FIG. 6. In particular, it is possible to scroll the preview display up to a preview image the user wants by touch control or gesture control, and display the desired preview image.

Here, designated at 3118A in FIG. 6 is a trash icon. When a selected page is dragged to this trash icon 3118A, the page can be deleted.

When a single page display icon 3118B is pressed down, the preview image with, for example three pages displayed, is changed to one page representation (in this case one page is displayed in a large scale). When a multiple page display icon 3118C is pressed down, the preview image with, for example, one page displayed, is changed to three page representation.

Next, the configuration of control unit 120 (FIGS. 1 and 3) will be described in detail with reference to the drawings.

Figure 7:
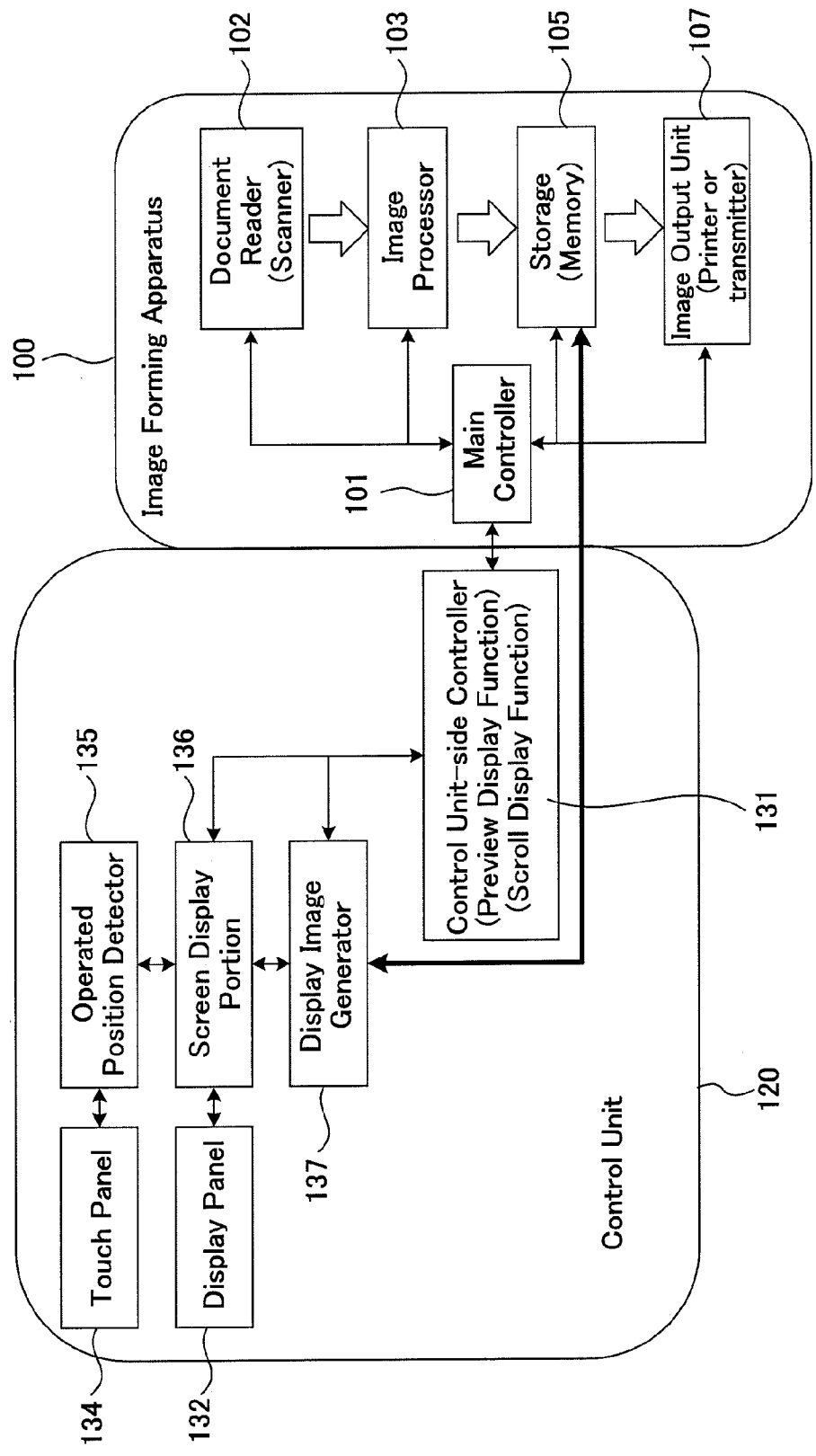
FIG. 7 is a block diagram showing an electric configuration of a control unit in the image forming apparatus of the present embodiment.
Figure 8:
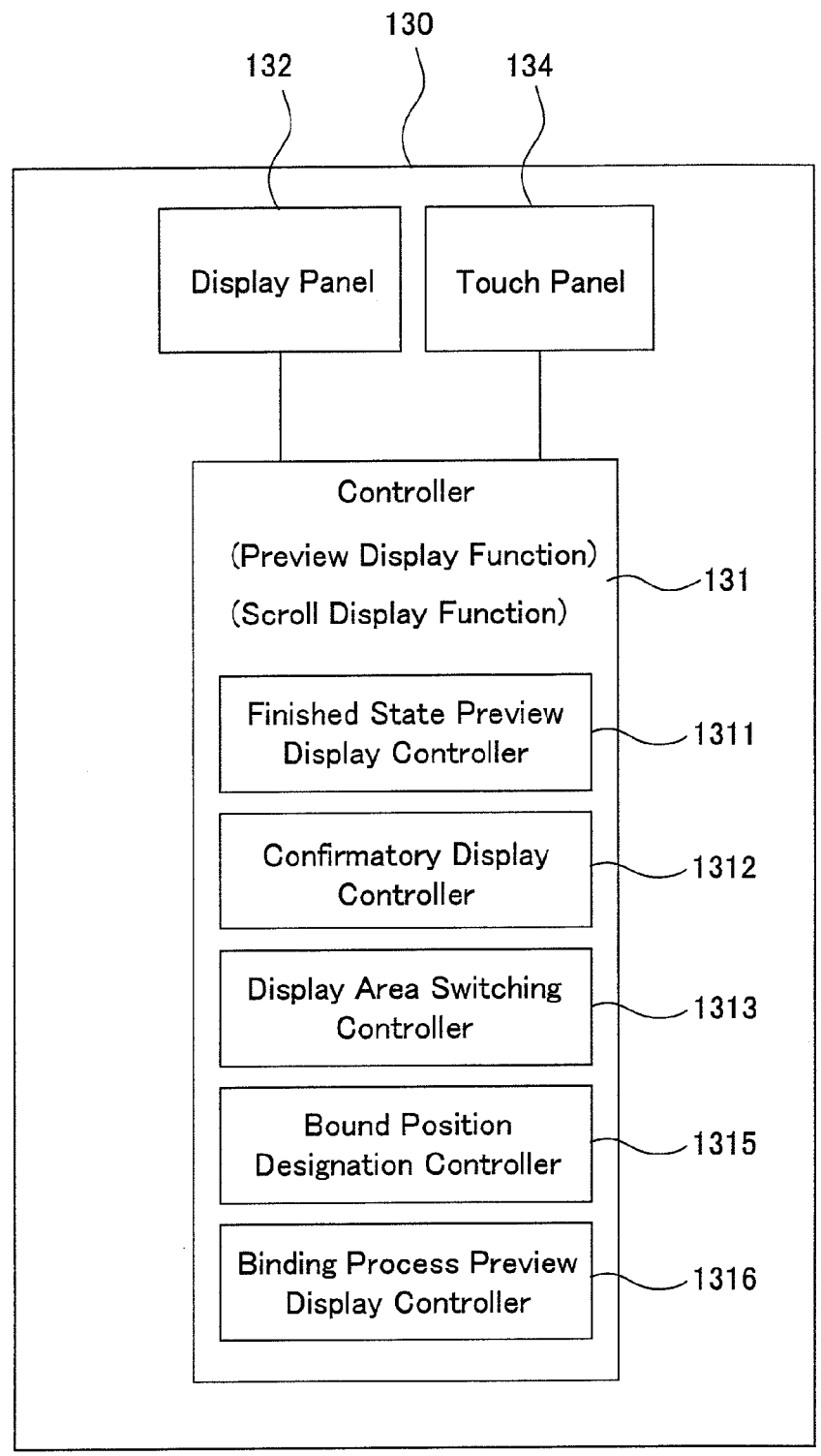
FIG. 8 is a block diagram showing a configuration of the touch panel display.
Figure 9:
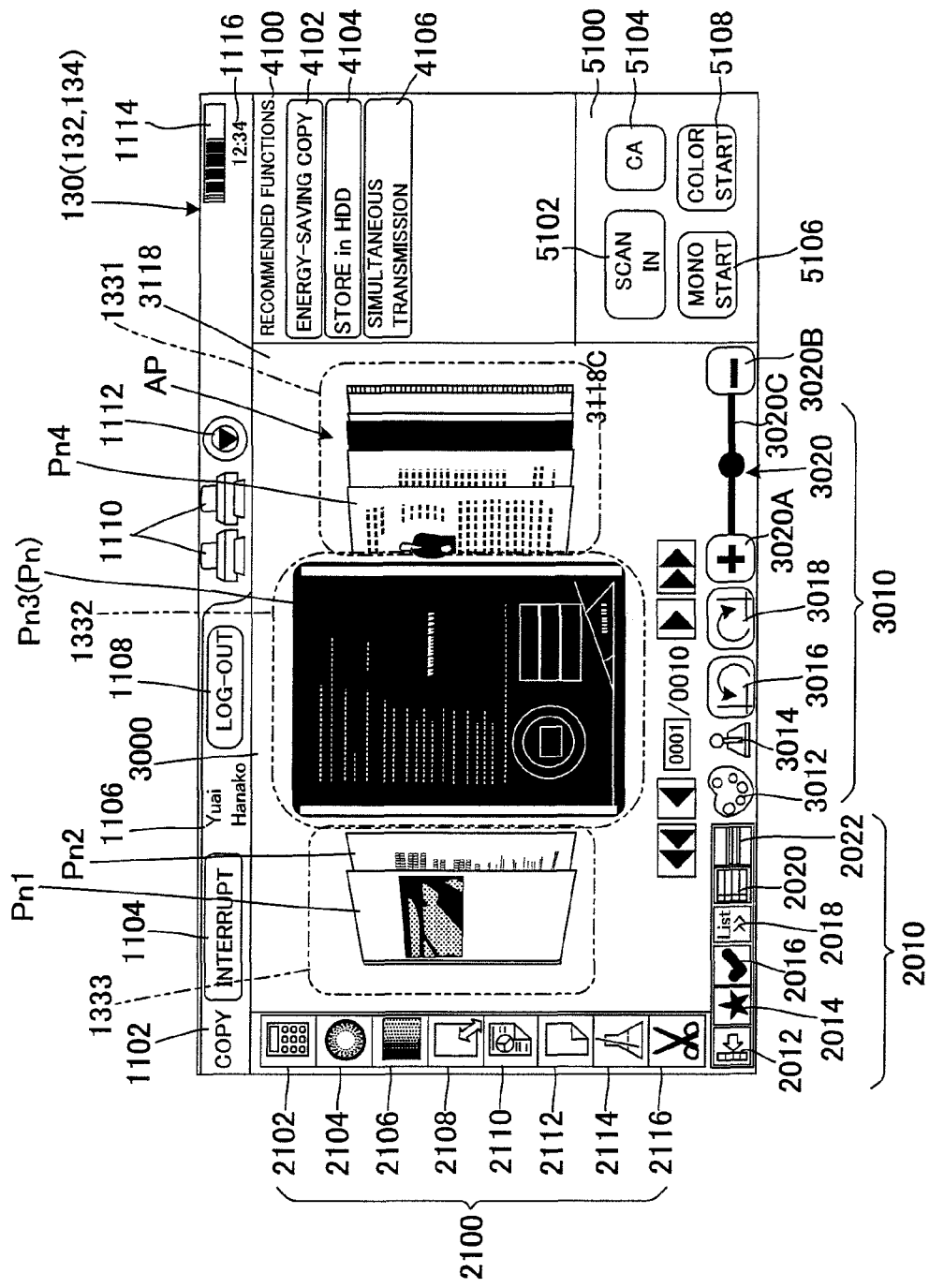
FIG. 9 is an illustrative view showing a display mode on a display panel that configures the touch panel display.

FIG. 7 is a block diagram showing an electric configuration of a control unit in the image forming apparatus of the present embodiment. FIG. 8 is a block diagram showing the configuration of a touch panel display of the control unit. FIG. 9 is an illustrative view showing a display mode of a display panel of the touch panel display that forms the control unit of the image forming apparatus of the present embodiment.

As shown in FIG. 7, control unit 120 includes, in addition to display panel 132 and touch panel 134, an operated position detector 135, a screen display portion 136, a display image generator 137 and a control unit-side controller (display controller) 131 for controlling processing and operation in control unit 120.

Image forming apparatus 100 includes document reader 102 for capturing image data, an image processor 103, a storage 105 for storing image data input through document reader 102 and an image output unit 107 such as a printer, transmitter or the like for outputting images, all being operated and controlled by a main controller 101.

Operated position detector 135 detects the touch position (operated position) on touch panel 134.

Screen display portion 136 displays an image formed by display image generator 137 on display panel 132.

Display image generator 137 prepares a predetermined image based on image data input to the main body of image forming apparatus 100, following instructions from control unit-side controller 131.

Control unit-side controller 131 is connected to main controller 101 of the main body of image forming apparatus 100 and functions as a controller in touch panel display 130 (FIG. 1).

Now, control unit-side controller 131 will be described in detail.

As shown in FIG. 8, control unit-side controller 131 serves as a controller of touch panel display 130, and has a preview display function of displaying multiple pages of document images on display panel 132 and a scroll display function of displaying preview of multiple pages of document images in a scrollable manner. Control unit-side controller 131 further includes a finished state preview display controller 1311, a confirmatory display controller 1312, a display area switching controller 1313, a bound position designation controller 1315 and a binding process preview display controller 1316.

Finish-state display controller 1311 performs control of displaying the finished condition of the hard copy to be offered by a post-processing machine as a preview image on display panel 132.

Confirmatory display controller 1312 performs control of displaying preview document images on display panel 132 for confirmation by turning the images pagewise.

Display area switching controller 1313 performs control of switching the positional relationship between an aftermentioned first display area 1331, second display area 1332 and third display area 1333, in preview region 3000.

Bound position designation controller 1315 performs control of designating a bound position S (FIG. 10*a*, for example) on printed paper (recording mediums) when a binding operation is performed after document images are recorded on the printed sheets.

Binding process preview display controller 1316 performs control of displaying a preview image of the recording paper that is bound at the bound position S (FIG. 10*a*, for example) designated by bound position designation controller 1315.

Display panel 132 has first display area 1331, second display area 1332 and third display area 1333 inside preview region (preview display region) 3000 for displaying preview images, as shown in FIG. 9.

Second display area 1332 is an area that displays an image of the page to be turned Pn3 (Pn) of hard copy AP pagewise in two dimensions.

First display area 1331 is an area that displays the image of the pages that follow the image of the page to be turned Pn3 (Pn) in three dimensions in a state where hard copy AP is finished.

Third display area 1333 is an area that displays the image of the pages that precede the image of the page to be turned Pn3 (Pn) in three dimensions in a state where hard copy AP is finished. That is, third display area 1333 three-dimensionally displays the images of the page to be turned Pn1, Pn2 . . . that have been displayed for confirmation in second display area 1332, in layers in order.

Here, "to display three-dimensionally" means to display preview images in a representation giving a feeling of perspective, and display the preview images by a perspective representation in a perspective view.

In the present embodiment, first display area 1331, second display area 1332 and third display area 1333 are laid out abreast (in the horizontal direction) of display panel 132 in order.

Specifically, second display area 1332 is arranged at the approximate center of preview region 3000 while first display area 1331 and third display area 1333 are laid out on both sides of this second display area 1332.

Here, as a variational example, first display area 1331 and third display area 1333 may be laid out at top and bottom of second display area 1332. It is also possible to change the layout of display areas, depending on the shape of display panel 132 and/or the shape of preview region 3000.

Second display area 1332 is configured to the largest in size among the first, second and third display areas 1331, 1332 and 1333. This configuration allows the user ease of checking the content in image of the page to be turned Pn3 displayed in second display area 1332.

Image of the page to be turned Pn3 is displayed two-dimensionally with its page face oriented frontward on second display area 1332.

Image of the page to be turned Pn3 displayed for confirmation in second display area 1332 includes a greater amount of information than that in each page of image displayed in first display area 1331 and third display area 1333.

Further, on display panel 132, control keys for operation and control, i.e., so-called task trigger keys such as a scan-in key 5102, monochrome start key 5106, color start key 5108, clear-all key 5104 and the like are constantly displayed, as shown in FIG. 9.

When image forming is performed on both sides (front and rear sides) of a printing sheet, image of the page to be turned Pn3 to be displayed for confirmation is displayed in second display area 1332 in such a manner that the front side (the first side: top side) is displayed in second display area 1332 first, then the rear side (the second side: bottom side) is displayed and thereafter the page is moved to, and displayed in, third display area 1333.

Further, when image forming is performed on both sides of a printing sheet, image of the page to be turned Pn3 is displayed in second display area 1332 in such a manner that the front side is rotated in conformity with the bound position S (FIG. 10a, for example) of the recording mediums so as to display the rear side.

Furthermore, when image forming is performed on both sides of a printing sheet, image of the page to be turned Pn3 is displayed in second display area 1332 in such a manner that the image is positioned closer to first display area 1331 when the front side is displayed, and the image is positioned closer to third display area 1333 when the rear side is displayed.

Next, how the finished state of the hard copy is confirmed before printing through the preview representation of touch panel display 130 in image forming apparatus 100 will be specifically described with examples.

Example 1

To begin with, a case in which the hard copy is finished as a "one-sided left-bound booklet", will be described.

FIGS. 10a to 10f are illustrative views showing the operation of checking the finished state of a "one-sided left-bound" hard copy through the preview representation on the display panel of the control unit of the present embodiment.

Display panel 132 in example 1 has second display area 1332 arranged at the approximate center of preview region 3000 while first display area 1331 and third display area 1333 are arranged on the right and left sides of this second display area 1332, respectively, as shown in FIGS. 10a to 10f.

When the finished condition of the hard copy is confirmed before printing, it is possible to check by displaying the finished state of the hard copy on display panel 132 in preview representation and turning over pages by a sliding touch (flick gesture).

Figure 10A:
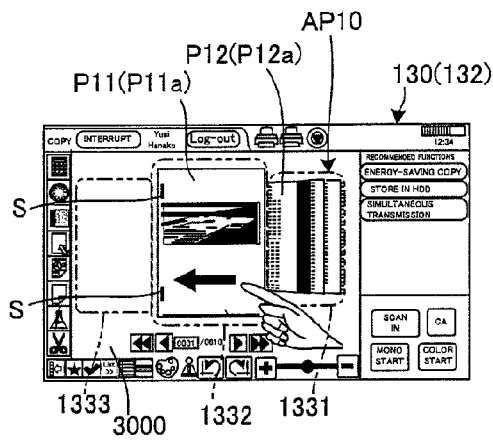
FIGS. 10a to 10f are illustrative views showing the control of confirming the finished state of a "one-sided left bound" hard copy, through the preview representation on the display panel.
Figure 10B:
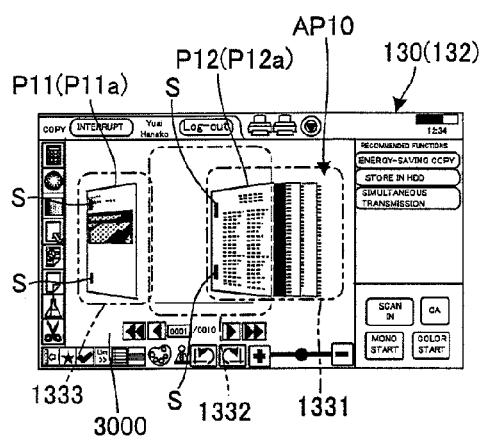

First, when a preview image of a finished material based on the image data of input documents is displayed, the initial screen on display panel 132 is displayed on touch panel display 130, as shown in FIG. 10a. At this point, in second display area 1332 on the center of display panel 132, the first page image P11 is displayed two-dimensionally, in a state where the front side P11a is shown. In first display area 1331 on the right side of display panel 132, a bundle of sheets AP10a consisting of the second and following sheets of hard copy AP10 is three-dimensionally displayed in a state where the front side P12a of the second sheet image P12 is shown. Here, image P11a is displayed to be larger than image P12a.

Next, when the second sheet image P12 is displayed for confirmation, the first sheet image P11 is touched in a sliding manner (flicked) in the direction of the arrow (from right to left) as shown in FIG. 10a so as to give instructions to turn over the page. As a result, the first sheet image P11 is reduced in size, shifted leftwards in display panel 132 to third display area 1333 and displayed three-dimensionally, in a state where the front side P11a is displayed, as in FIG. 10b.

Figure 10C:
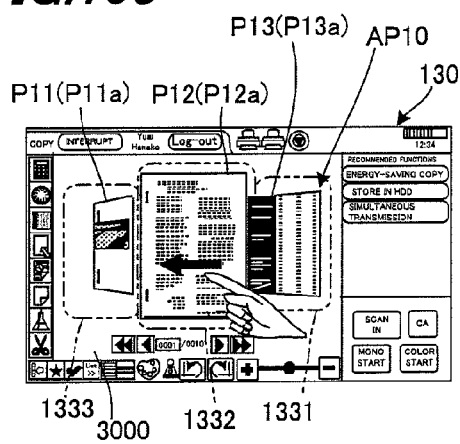

Then, as shown in FIG. 10c, the second sheet image P12 moves from the first display area 1331 toward the vacant second display area 1332 while it is being enlarged, and is displayed in the second display area 1332 in such a state that the front side P12a is enlarged and shown two-dimensionally.

Figure 10D:
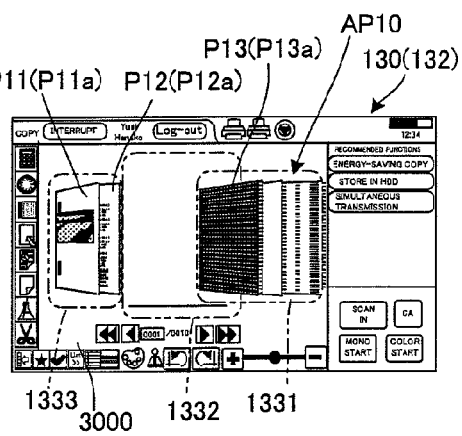

Subsequently, when the third sheet image P13 is displayed for confirmation, the second sheet image P12 is touched in a sliding manner (flicked) in the direction of the arrow (from right to left) as shown in FIG. 10c so as to give instructions to turn over the page. As a result, as shown in FIG. 10d the second sheet image P12 is reduced in size, shifted to and behind the first sheet image P11 in the third display area 1333, and displayed three-dimensionally in a state where part of the front side P12a is shown.

Figure 10E:
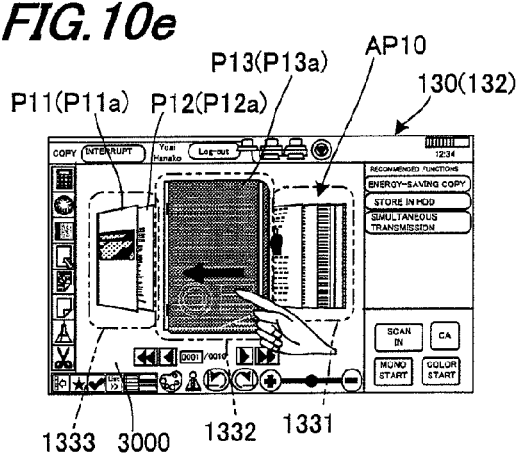

Then, as shown in FIG. 10e, third sheet image P13 moves from first display area 1331 toward the vacant second display area 1332 while it is being enlarged, and is displayed in second display area 1332 in such a state that the front side P13*a* is enlarged and shown two-dimensionally.

After this, similar operations as the above are repeated so that the user is able to confirm the finished state of hard copy AP10 while checking the content of images.

Figure 10F:
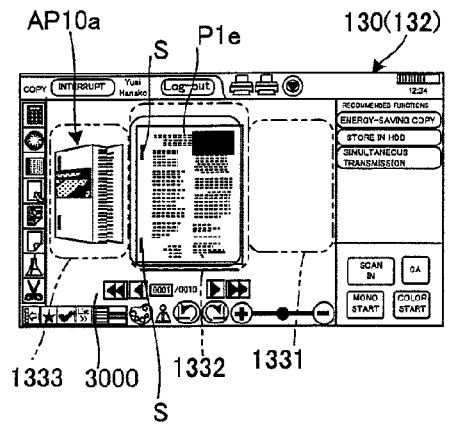

Then, finally, the final page image P1*e* is enlarged and displayed two-dimensionally in second display area 1332 while a bundle of preceding pages AP10*a* before the final page is three-dimensionally displayed, as shown in FIG. 10*f*.

Further, in touch panel display 130, the image of hard copy AP10 in its finished state displayed in first display area 1331 is touched in a sliding manner (flicked) so as to turn over pages in order from the first sheet image P11 in first display area 1331, whereby the pages are displayed in second display area 1332 and then shifted to third display area 1333 to be displayed three-dimensionally. With this arrangement, it is possible for the user to easily check the displayed content of the hard copy AP10 in a feeling as if the user is turning over the pages while actually holding "one-sided left-bound" hard copy AP10 at the bound position S (FIG. 10*a*). In this way, it is possible to easily check the finished state of "one-sided left-bound" hard copy AP10

Example 2

Next, a case in which the hard copy is finished as a "one-sided right-bound booklet", will be described.

FIGS. 11*a* to 11*f* are illustrative views showing the operation of checking the finished state of a "one-sided right-bound" hard copy through the preview representation on the display panel of the control unit of the present embodiment.

Display panel 132 in example 2 has second display area 1332 arranged at the approximate center of preview region 3000 while first display area 1331 and third display area 1333 are arranged on the left and right sides of this second display area 1332, respectively, as shown in FIGS. 11*a* to 11*f*.

Figure 11A:
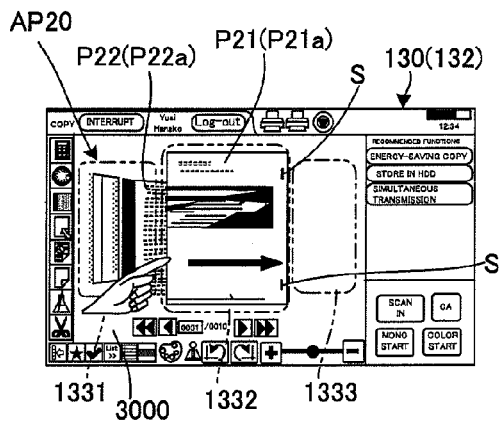
FIGS. 11a to 11f are illustrative views showing the control of confirming the finished state of a "one-sided right bound" hard copy, through the preview representation on the display panel.
Figure 11B:
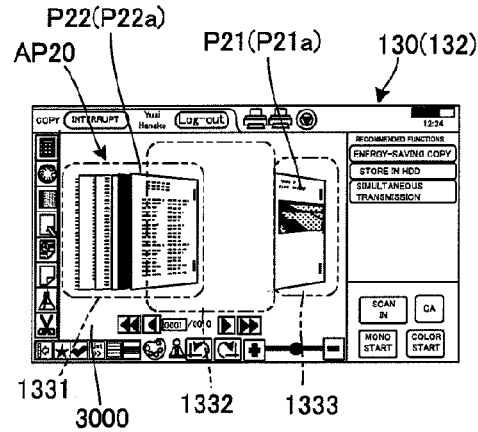

First, when a preview image of a finished material based on the image data of input documents is displayed, the initial screen of display panel 132 is displayed on touch panel display 130, as shown in FIG. 11*a*. At this point, in second display area 1332 on the center of display panel 132, the first sheet image P21 is displayed two-dimensionally, in a state where the front side P21*a* is shown. In first display area 1331 on the left side of display panel 132, a bundle of sheets AP20*a* consisting of the second and following sheets of hard copy AP20 is three-dimensionally displayed in a state where the front side P22*a* of the second sheet image P22 is shown. Here, image P21*a* is displayed to be larger than image P22*a*.

Next, when the second sheet image P22 is displayed for confirmation, the first sheet image P21 is touched in a sliding manner (flicked) in the direction of the arrow (from the left to right) as shown in FIG. 11*a* so as to give instructions to turn over the page. As a result, the first sheet image P21 is reduced in size, shifted rightwards in display panel 132 to third display area 1333 and displayed three-dimensionally, in a state where the front side 221*a* is displayed, as in FIG. 11*b*.

Figure 11C:
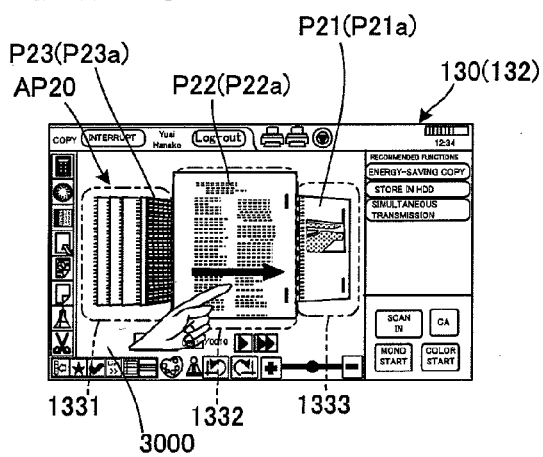

Then, as shown in FIG. 11*c*, the second sheet image P22 moves from the first display area 1331 toward the vacant second display area 1332 while it is being enlarged, and is displayed in the second display area 1332 in such a state that the front side P22*a* is enlarged and shown two-dimensionally.

Figure 11D:
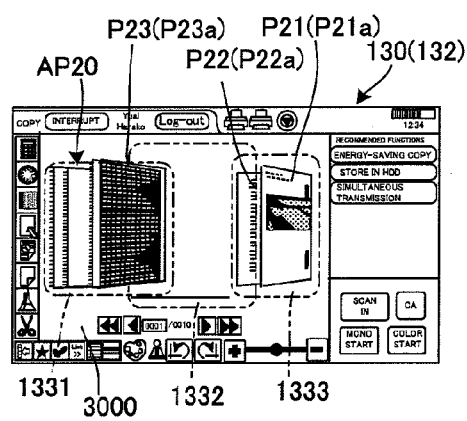

Subsequently, when the third sheet image P23 is displayed for confirmation, the second sheet image P22 is touched in a sliding manner (flicked) in the direction of the arrow (from the left to right) as shown in FIG. 11*c* so as to give instructions to turn over the page. As a result, as shown in FIG. 11*d* the second sheet image P22 is reduced in size, shifted to and behind the first sheet image P21 in the third display area 1333, and displayed three-dimensionally in a state where part of the front side P22*a* is shown.

Figure 11E:
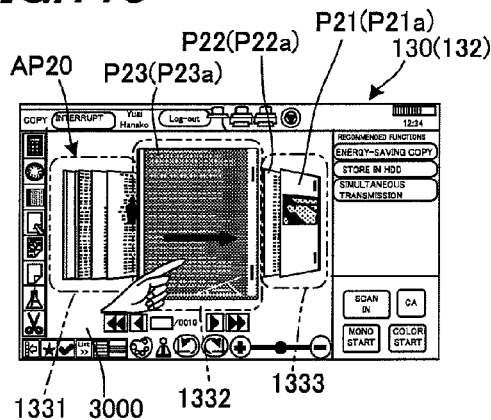

Then, as shown in FIG. 11*e*, third sheet image P23 moves from first display area 1331 toward the vacant second display area 1332 while it is being enlarged, and is displayed in second display area 1332 in such a state the front side P23*a* is enlarged and shown two-dimensionally.

After this, similar operations as the above are repeated so that the user is able to confirm the finished state of hard copy AP20 while checking the content of images.

Figure 11F:
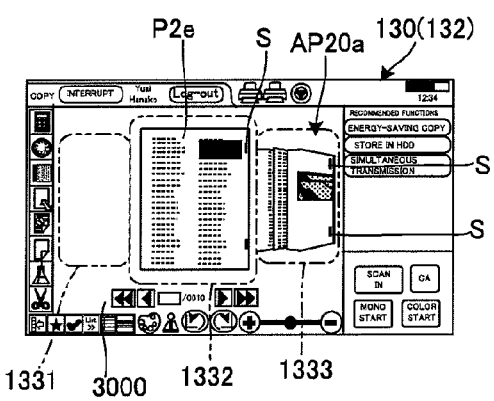

Then, finally, the final page image P2*e* is enlarged and displayed two-dimensionally in second display area 1332 while a bundle of preceding pages AP20*a* before the final page is three-dimensionally displayed, as shown in FIG. 11*f*.

Further, in touch panel display 130, the image of hard copy AP20 in its finished state displayed in first display area 1331 is touched in a sliding manner (flicked) so as to turn over pages in order from the first sheet image P21 in first display area 1331, whereby the pages are displayed in second display area 1332 and then shifted to third display area 1333 to be displayed three-dimensionally. With this arrangement, it is possible for the user to easily check the displayed content of the hard copy in a feeling as if the user is turning over the pages while actually holding "one-sided right-bound" hard copy AP20 at the bound position S (FIG. 11*a*). In this way, it is possible to easily check the finished state of "one-sided right-bound" hard copy AP20.

Example 3

Next, a case in which the hard copy is finished as a "dual-sided left-bound booklet", will be described.

FIGS. 12*a* to 12*f* are illustrative views showing the operation of checking the finished state of a "dual-sided left-bound" hard copy through the preview representation on the display panel of the control unit of the present embodiment.

Display panel 132 in example 3 has second display area 1332 arranged at the approximate center of preview region 3000 while first display area 1331 and third display area 1333 are arranged on the right and left sides of this second display area 1332, respectively, as shown in FIGS. 12*a* to 12*f*.

Figure 12A:
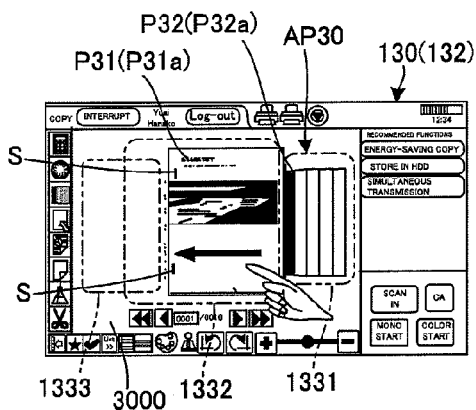
FIGS. 12a to 12f are illustrative views showing the control of confirming the finished state of a "dual-sided left bound" hard copy, through the preview representation on the display panel.

First, when a preview image of a finished material based on the image data of input documents is displayed, the initial screen of display panel 132 is displayed on touch panel display 130, as shown in FIG. 12*a*. At this point, in second display area 1332 on the center of display panel 132, the first sheet image P31 is displayed two-dimensionally, in a state where the front side P31*a* is shown. In first display area 1331 on the right side of display panel 132, a bundle of sheets AP30*a* consisting of the second and following sheets of hard copy AP30 is three-dimensionally displayed in a state where the front side P32*a* of the second sheet image P32 is shown. Here, image P31*a* is displayed to be larger than image P32*a*.

At this point, the first sheet image P31 displayed in second display area 1332 is laid out closer to first display area 1331. The first sheet image P31 is displayed so as to overlap and hide part of the second sheet image P32 being displayed in first display area 1331.

Figure 12B:
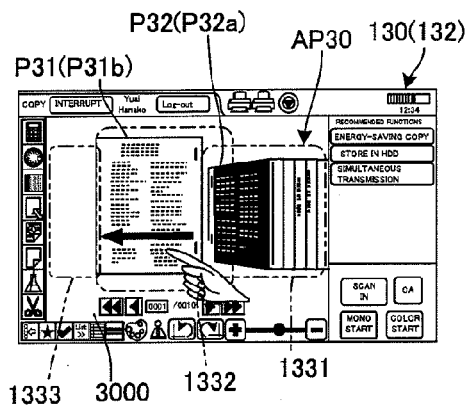

Then, as the front side P31*a* of first sheet image P31 is touched in a sliding manner (flicked) so as to give instructions to turn over the page, the first sheet image P31 is turned 180 degrees horizontally, moving closer to third display area 1333, and displayed two-dimensionally in a state where the rear side P31*b* is displayed, as in FIG. 12*b*.

At this point, the first sheet image P31 is displayed at such a position as not to overlap the second sheet image P32 being displayed in first display area 1331. As a result, it is possible for the user to easily check the rear side P31b of the first sheet image P31 and also check the front side P32a of the next second sheet image P32. That is, it is possible to view the rear side P31b and the front side P32a in a spread.

Next, when the second sheet image P32 is displayed for confirmation, the rear side P31b of the first sheet image P31 is touched in a sliding manner (flicked) in the direction of the arrow (from right to left) as shown in FIG. 12b so as to give instructions to turn over the page. As a result, the first sheet image P31 is reduced in size, shifted to third display area 1333 and displayed three-dimensionally in a state where the rear side P31b is displayed, as in FIG. 12c.

Then, in link with the movement of first sheet image P31, the second sheet image P32 moves from the first display area 1331 toward the vacant second display area 1332 while it is being enlarged, and is displayed in the second display area 1332 in such a state that the front side P32a is enlarged and shown two-dimensionally.

At this point, the second sheet image P32 displayed in second display area 1332 is displayed closer to first display area 1331. The second sheet image P32 is displayed so as to overlap and hide part of the third sheet image P33 being displayed in first display area 1331 and in such a position as not to overlap the first sheet image P31 being displayed in third display area 1333. With this arrangement, it is possible for the user to easily check the front side P32a of second sheet image P32 and confirm its connection to rear side P31b of the previous first sheet image P31.

Figure 12C:
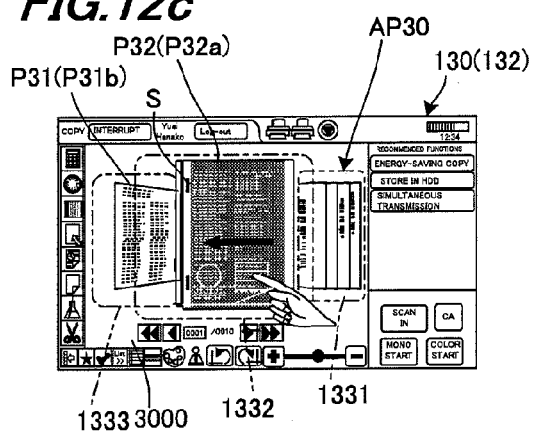

When the rear side P32b of the second sheet image P32 is displayed, the front side P32a of second sheet image P32 is touched in a sliding manner (flicked) to give instructions to turn over the page as shown in FIG. 12c. As a result, the second sheet image P32 is turned 180 degrees horizontally, moving closer to third display area 1333, and displayed two-dimensionally in a state where the rear side P32b is shown.

At this point, the second sheet image P32 is displayed at such a position as not to overlap the third sheet image P33 being displayed in first display area 1331. As a result, the user is able to check the front side P33a of third sheet image P33 being displayed in first display area 1331.

Figure 12D:
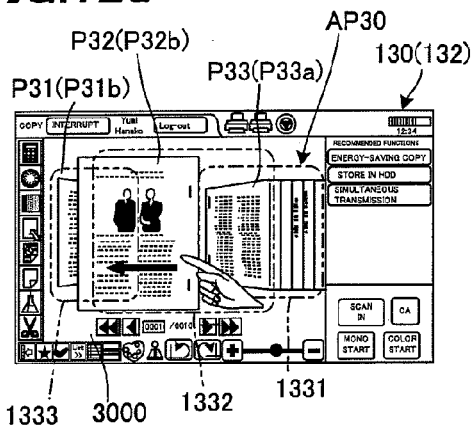

Next, when the third sheet image P33 is displayed for confirmation, the second sheet image P32 is touched in a sliding manner (flicked) in the direction of the arrow (from right to left) as shown in FIG. 12d so as to give instructions to turn over the page. As a result, the second sheet image P32 is reduced in size, shifted so as to overlap and hide part of the first sheet image P31 and displayed three-dimensionally in a state where the rear side P32b is displayed as in FIG. 12e.

Figure 12E:
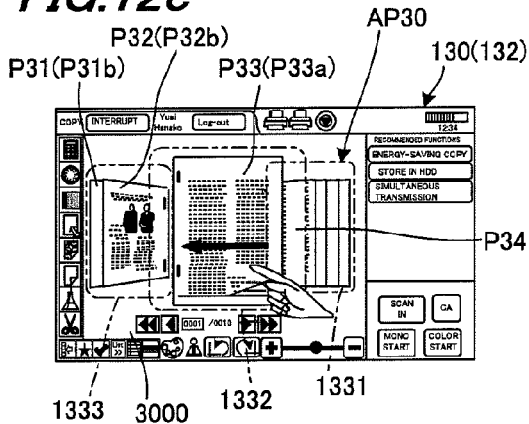

Then, in link with the movement of second sheet image P32, the third sheet image P33 moves from the first display area 1331 toward the vacant second display area 1332 while it is being enlarged, and is displayed in the second display area 1332 in such a state that the front side P33a is enlarged and shown two-dimensionally, as shown in FIG. 12e.

At this point, the third sheet image P33 displayed in second display area 1332 is placed closer to first display area 1331. The third sheet image P33 is displayed so as to overlap and hide part of the fourth sheet image P34 being displayed in first display area 1331 and in such a position as not to overlap the second sheet image P32 being displayed in third display area 1333. With this arrangement, it is possible for the user to easily check the front side P33a of third sheet image P33 and confirm its connection to rear side P32b of the second sheet image P32.

After this, similar operations as the above are repeated so that the user is able to confirm the finished state of hard copy AP30 while checking the content of images.

Figure 12F:
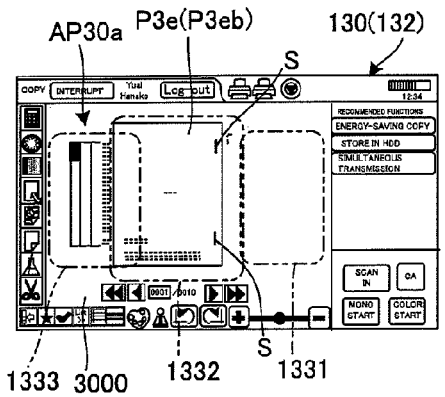

Then, finally, the rear side of P3eb of the final sheet image P3e is enlarged and displayed two-dimensionally in second display area 1332 while a bundle of preceding pages AP30a before the final page is three-dimensionally displayed in third display area 1333, as shown in FIG. 12f.

As described above, in touch panel display 130, the image of hard copy AP30 in its finished state displayed in first display area 1331 is touched in a sliding manner (flicked) so as to turn over pages in order from the first sheet image P31 in first display area 1331 so that the pages are displayed in second display area 1332, the front side first and then the rear side, thereafter the sheet is shifted to third display area 1333 to be displayed three-dimensionally. With this arrangement, it is possible for the user to check the displayed content of the hard copy in a feeling as if the user is turning over the pages while actually holding "dual-sided left-bound" hard copy AP30 at the bound position S (FIG. 12a and FIG. 12f, for example). In this way, it is possible to easily confirm the finished state of "dual-sided left-bound" hard copy AP30.

Referring now to the drawings, specific description will be given on the operation of making the transition of the front side image of a sheet to the rear side image by turning the preview image of the sheet of "dual-sided left-bound" hard copy in the horizontal direction.

FIGS. 13a to 13d are illustrative views showing the states of making the transition of rotating the front side of a sheet to the rear side of a "dual-sided left bound" hard copy displayed in preview on the display panel of the control unit of the present embodiment.

Herein, description will be made on a case where the third sheet image P33 displayed in second display area 1332 of display panel 132 is rotated and transited from the front side P33a to the rear side P33b.

Figure 13A:
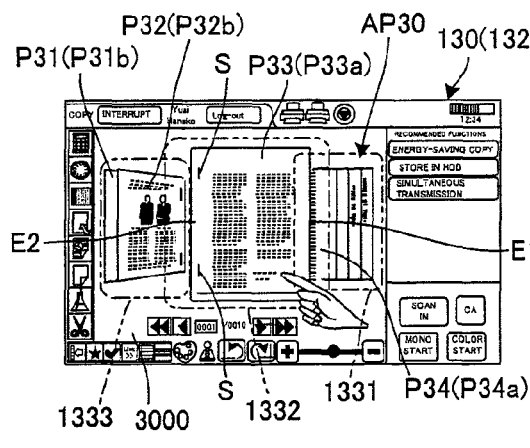
FIGS. 13a to 13d are illustrative views showing the states of making the transition of rotating the front side of a sheet to the rear side in a "dual-sided left bound" hard copy displayed in preview on the display panel.

As shown in FIG. 13a, when the third sheet image P33 is displayed in second display area 1332 with its front side P33a shown, the third sheet image P33 is laid out at a position close to first display area 1331 so as to overlap and hide part of front side P34a of the fourth sheet image P34 and so as not to overlap rear side P32b of the second sheet image P32.

Figure 13B:
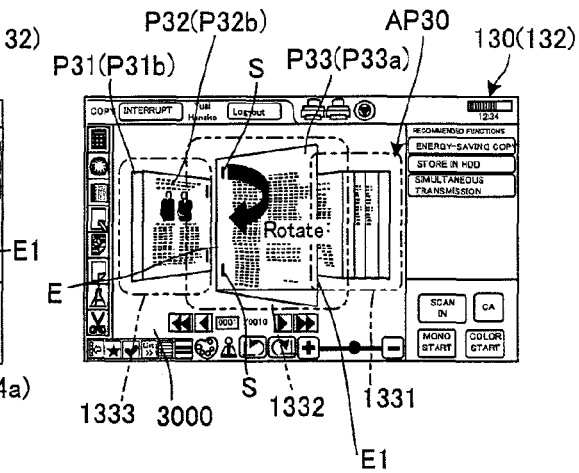
Figure 13C:
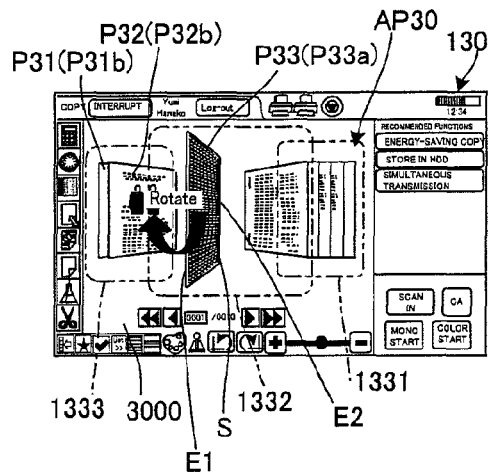

When rear side P33b of the third sheet image P33 is displayed for confirmation, the front side P33a of the third sheet image P33 is touched in a sliding manner (flicked) so as to give instruction of turning over the page. As a result, the side edge E1 of third sheet image P33 on the opposite side from the bound position S moves toward the third display area 1333 and rotates 180 degrees horizontally, pivoting on the side edge E2 on the bound position S side, as shown in FIGS. 13b and 13c.

Figure 13D:
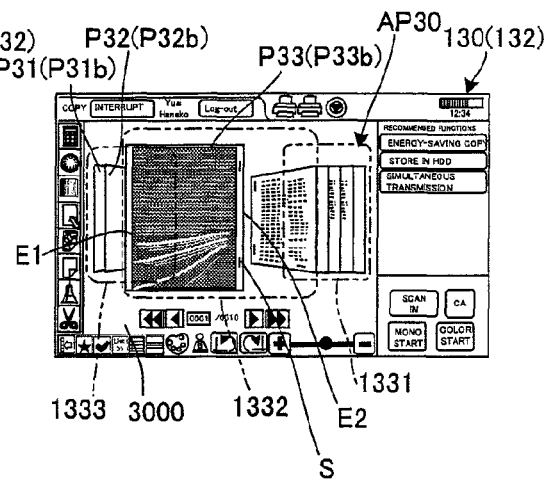

Then, the third sheet image P33 is displayed two-dimensionally in a state where rear side P33b is displayed as in FIG. 13d. At this point, the rear side P33b of third sheet image P33 being displayed in second display area 1332 is arranged closer to third display area 1333.

Thus, the front and rear sides of two sheets (two facing pages) are displayed so as not to overlap each other, whereby it is possible for the user to easily check the content of pages in a two-page spread style.

In the above way, it is possible for the user to check the displayed content of dual-sided bound hard copy AP30 in a feeling as if the user is turning over pages by rotating each page about a pivot at the bound position S while actually holding the hard copy AP30. As a result, the user can easily check the finished state of hard copy AP30.

Example 4

Next, a case in which the hard copy is finished as a "dual-sided top-bound booklet", will be described.

FIGS. 14*a* to 14*f* are illustrative views showing the operation of checking the finished state of the hard copy of a "dual-sided top-bound booklet", through the preview representation on the display panel of the control unit of the present embodiment.

Display panel 132 in example 4 has second display area 1332 arranged at the approximate center of preview region 3000 while first display area 1331 and third display area 1333 are arranged on the right and left sides of this second display area 1332, respectively, as shown in FIGS. 14*a* to 14*f*.

Figure 14A:
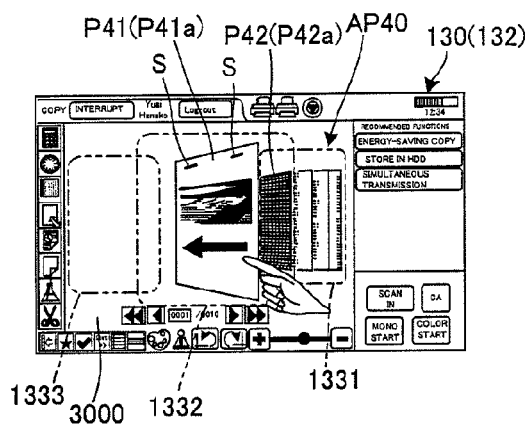
FIGS. 14a to 14f are illustrative views showing the control of confirming the finished state of a "dual-sided top bound" hard copy, through the preview representation on the display panel.

First, when a preview image of a finished material based on the image data of input documents is displayed, the initial screen of display panel 132 is displayed on touch panel display 130, as shown in FIG. 14*a*. At this point, a first sheet image P41 is three-dimensionally displayed in second display area 1332 of the center on display panel 132, in such a state that the front side P41*a* is shown. In first display area 1331 on the right side of display panel 132, a bundle of sheets AP40 consisting of the second and following sheets of hard copy AP40 is three-dimensionally displayed in such a state that the front side P42*a* of the second sheet image P42 is shown. Here, image P41 in second display area 1332 is displayed to be larger than image P42 in first display area 1331.

At this point, the first sheet image P41 displayed in second display area 1332 is displayed closer to first display area 1331. The first sheet image P41 is displayed so as to overlap and hide part of the second sheet image P42 being displayed in first display area 1331.

Figure 14B:
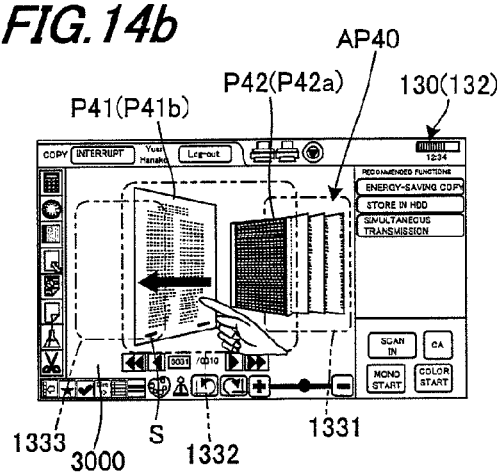
Figure 14C:
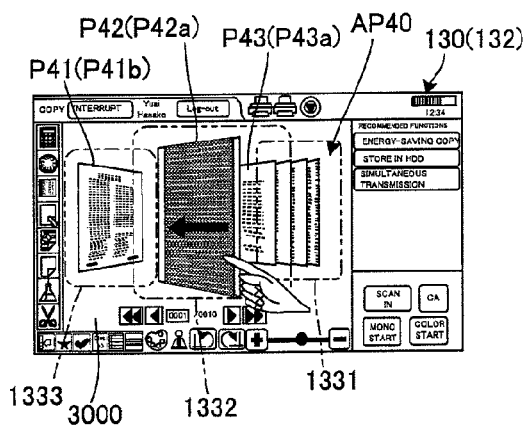

Then, as the front side P41*a* of first sheet image P41 is touched in a sliding manner (flicked) so as to give instructions to turn over the page, the first sheet image P41 is turned 180 degrees vertically, shifting closer to third display area 1333, and displayed three-dimensionally in a state where the rear side P41*b* is displayed as in FIG. 14*b* (see FIGS. 15*a* to 15*f* as to the vertical rotation of 180 degrees).

At this point, the first sheet image P41 is displayed at such a position as not to overlap the second sheet image P42 being displayed in first display area 1331. As a result, it is possible for the user to easily check the rear side P41*b* of the first sheet image P41 and also confirm its connection to the front side P42*a* of the next second sheet image P42.

Next, when the second sheet image P42 is displayed for confirmation, the first sheet image P41 is touched in a sliding manner (flicked) in the direction of the arrow (from right to left) as shown in FIG. 14*b* so as to give instructions to turn over the page. As a result, the first sheet image P41 is reduced in size, shifted to third display area 1333 in the left part of display panel 132 and displayed three-dimensionally in a state where the rear side P41*b* is displayed as in FIG. 14*c*.

Then, in link with the movement of first sheet image P41, the second sheet image P42 moves from the first display area 1331 toward the vacant second display area 1332 while it is being enlarged, and is displayed in the second display area 1332 in such a state that the front side P42*a* is enlarged and shown three-dimensionally.

At this point, the second sheet image P42 displayed in second display area 1332 is arranged closer to first display area 1331. The second sheet image P42 is displayed so as to overlap and hide part of the third sheet image P43 being displayed in first display area 1331 and in such a position as not to overlap the first sheet image P41 being displayed in third display area 1333. With this arrangement, it is possible for the user to easily check the front side P42*a* of second sheet image P42 and confirm its connection to rear side P41*b* of the previous first sheet image P41.

Figure 14D:
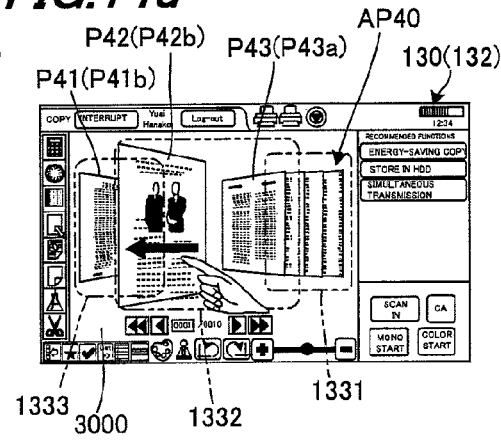

When the rear side P42*b* of the second sheet image P42 is displayed, the front side P42*a* of second sheet image P42 is touched in a sliding manner (flicked) to give instructions to turn over the page as shown in FIG. 14*d*. As a result, the second sheet image P42 is turned 180 degrees in the vertically direction whilst shifting closer to third display area 1333, and displayed three-dimensionally in a state where the rear side P42*b* is shown (see FIGS. 15*a* to 15*f* as to the vertical rotation of 180 degrees).

At this point, the second sheet image P42 is displayed at such a position as not to overlap the third sheet image P43 being displayed in first display area 1331 so that it the user can check the front side P43*a* of the third sheet image P43 being displayed in first display area 1331.

Next, when the third sheet image P43 is displayed for confirmation, the second sheet image P42 is touched in a sliding manner (flicked) in the direction of the arrow (from right to left) as shown in FIG. 14*d* so as to give instructions to turn over the page. As a result, the second sheet image P42 is reduced in size, shifted so as to overlap and hide part of the first sheet image P41 and displayed three-dimensionally in a state where the rear side P42*b* is displayed as in FIG. 14*e*.

Figure 14E:
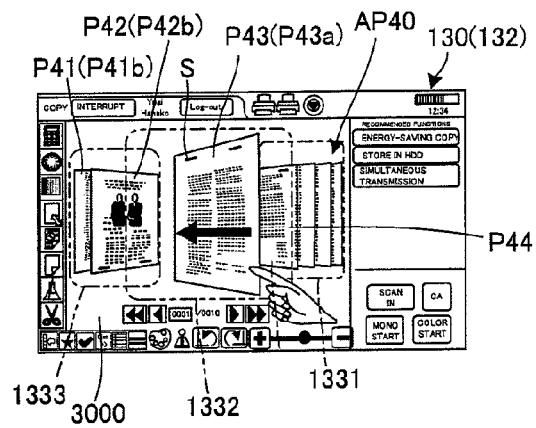

Then, in link with the movement of second sheet image P42, the third sheet image P43 moves from the first display area 1331 toward the vacant second display area 1332 while it is being enlarged, and is displayed in the second display area 1332 in such a state that the front side P43*a* is enlarged and shown three-dimensionally, as shown in FIG. 14*e*.

At this point, the third sheet image P43 displayed in second display area 1332 is placed closer to first display area 1331. The third sheet image P43 is displayed so as to overlap and hide part of the fourth sheet image P44 being displayed in first display area 1331 and in such a position as not to overlap the second sheet image P42 being displayed in third display area 1333. With this arrangement, it is possible for the user to easily check the front side P43*a* of third sheet image P43 and confirm its connection to rear side P42*b* of the second sheet image P42.

After this, similar operations as the above are repeated so that the user is able to confirm the finished state of hard copy AP40 while checking the content of images.

Figure 14F:
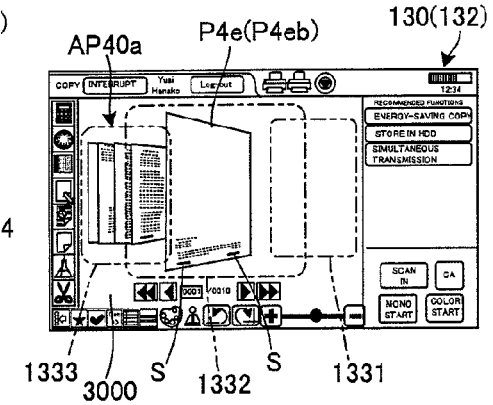

Then, finally, the rear side of P4*eb* of the final sheet image P4*e* is enlarged and displayed three-dimensionally in second display area 1332 while a bundle of preceding pages AP40*a* before the final page is three-dimensionally displayed in third display area 1333, as shown in FIG. 14*f*.

Further, in touch panel display 130, the image of hard copy AP40 in its finished state displayed in first display area 1331 is touched in a sliding manner (flicked) so as to turn over pages in order from the first sheet image P41 in first display area 1331 so that the pages are displayed in second display area 1332, the front side first and then the rear side, thereafter the sheet is shifted to third display area 1333 to be displayed three-dimensionally. With this arrangement, the user is able to check the displayed content of the hard copy in a feeling as if the user is turning over the pages while actually holding "dual-sided top-bound" hard copy AP40 at the bound position S (FIG. 14*a*). In this way, it is possible to easily confirm the finished state of "dual-sided top-bound" hard copy AP40.

Though in the above example with FIG. 14, instructions of turning over the page are given by a sliding touch (flicking) in the horizontal direction, in the case of a "dual-sided top-bound hard copy, instructions of turning over the page may be given by a sliding touch (flicking) in the vertical direction.

Referring next to the drawings, specific description will be given on the operation of making the transition of the front side image of a sheet to the rear side image by turning the preview image of the sheet of a "dual-sided top-bound" hard copy in the vertical direction.

FIGS. 15a to 15h are illustrative views showing a state in which a sheet of "dual-sided top-bound" hard copy displayed in preview representation on the display panel of the control unit of the present embodiment is rotated from the front side to the rear side.

Figure 15A:
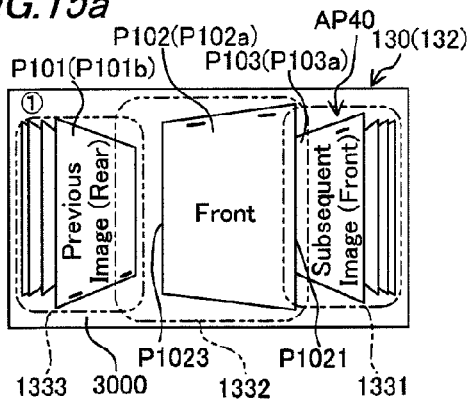
FIGS. 15a to 15h are illustrative views showing the states of making the transition of rotating the front side of a sheet to the rear side in a "dual-sided top bound" hard copy displayed in preview on the display panel.
Figure 15B:
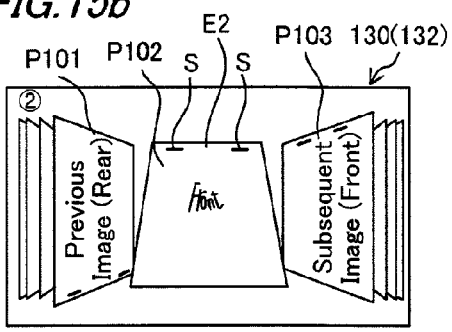
Figure 15C:
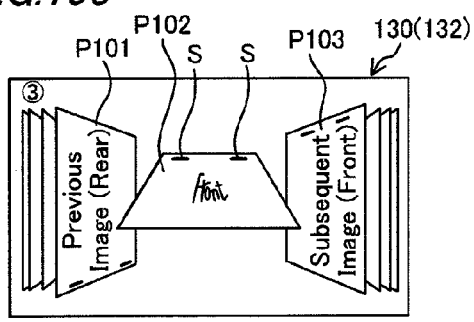
Figure 15D:
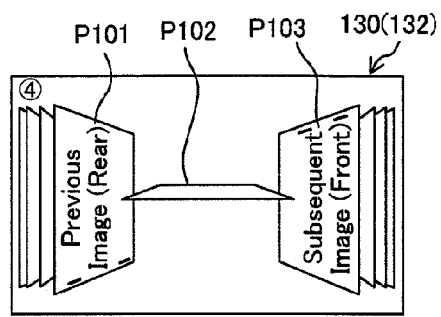
Figure 15E:
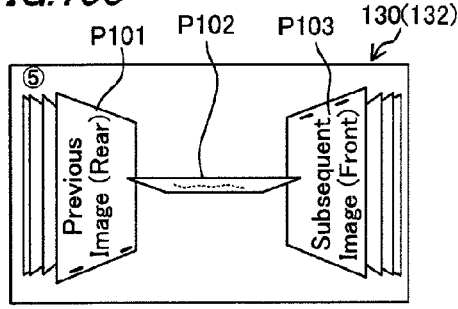
Figure 15F:
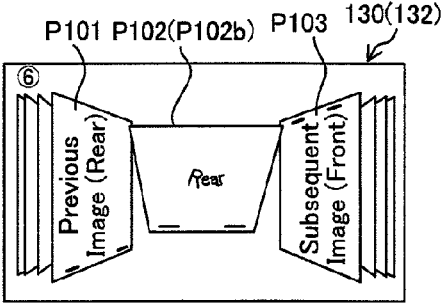
Figure 15G:
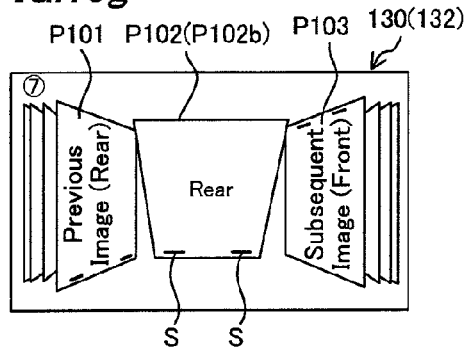

When image of the page to be turned P102 is displayed in second display area 1332 with its front side P102a displayed as in FIG. 15a, image of the page to be turned P102 is three-dimensionally displayed closer to first display area 1331 at such a position as to overlap and hide part of front side P103a of the subsequent image (following sheet) P103 and as not to overlap rear side P101b of the previous image (preceding sheet) P101.

That is, image of the page to be turned P102 is displayed such that its side edge P1023 located on the third display area 1333 side (on the previous image P101 side) of image of the page to be turned P102 is shorter than the side edge P1021 located on the first display area 1331 side (on the subsequent image P103 side) so that the front page P102a looks to be tilted toward the third display area 1333 side. In other words, the image of the page to be turned P102 is three-dimensionally displayed as if side edge P1023 on the previous image P101 side is located away from the front.

When rear side P102b of image of the page to be turned P102 is displayed, front side P102a of image of the page to be turned P102 is touched in a sliding manner (flicked) so as to give instructions of turning over the page upwards, as shown in FIG. 15a. As a result, image of the page to be turned P102 rotates 180 degrees vertically from the bottom to top, pivoting on a horizontal edge E2 located on the bound position S side, as shown in FIGS. 15b to 15g.

Figure 15H:
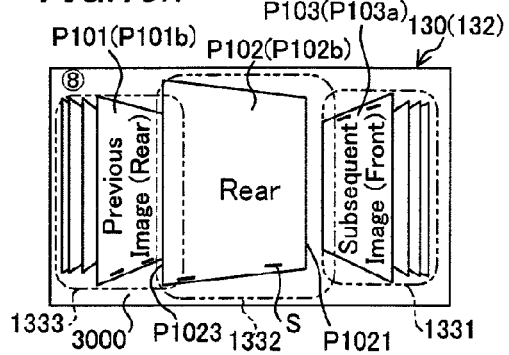

Then, image of the page to be turned P102 is three-dimensionally displayed with its rear side P102b displayed as in FIG. 15h. At this point, the rear side P102b of image of the page to be turned P102 is three-dimensionally displayed and placed closer to third display area 1333 at such a position as to overlap and hide part of rear side P101b of the closest previous image P101 and as not to overlap front side P103a of the closest following image P103.

That is, image of the page to be turned P102 is displayed such that its side edge P1021 located on the first display area 1331 side (on the subsequent image P103 side) of image of the page to be turned P102 is shorter than the side edge P1023 located on the third display area 1333 side (on the previous image P101 side) so that the rear side P102b looks to be tilted toward the first display area 1331 side.

In other words, the image of the page to be turned P102 is displayed as if side edge P1021 on the subsequent image P103 side is located away from the front.

Further, as shown in FIG. 15a, the previous image P101 immediately before image of the page to be turned P102 displayed in second display area 1332 is displayed with a greater amount of information than those of the images in third display area 1333 while the subsequent image P103 immediately after image of the page to be turned P102 displayed in second display area 1332 is displayed with a greater amount of information than those of the images in first display area 1331. With this display style, the user can easily check the information on the images P101 and P103 immediately before and after the image of the page to be turned P102 and can grasp the relationship of the preview image displayed for confirmation with the images immediately before and after, more efficiently.

The amount of information referred to herein indicates the size of the displayed area of an image.

As above, in a case of a dual-sided bound hard copy, it is possible to check the displayed content in the same feeling as if the user is turning over the pages along the bound position S whilst actually holding the hard copy. As a result, it is possible to easily confirm the finished state of the hard copy.

According to the first embodiment having thus configured, controller 131 for controlling the preview display of display panel 132 in control unit 120 is provided with finish-state preview display controller 1311 and confirmatory display controller 1312 while preview region 3000 of display panel 132 is provided with first display area 1331, second display area 1332 and third display area 1333 so as to give a preview display of the finished state of the hard copy to be completed by the post-processing apparatus, hence the user can check the preview image for confirmation whilst turning over the pages in the preview image. Accordingly, it is possible for the user to check the content, layout, the relationship between preceding and following pages, the bound state and the like in the same feeling as if the user is turning over pages whilst actually holding the bound position of the hard copy. As a result, it is possible for the user to easily grasp the concrete concept of the whole hard copy, hence imagine the finished state of the hard copy, thus making it possible to prevent occurrence of an erroneous copying operation and cut down on the waste of supplies.

According to the first embodiment, since, in preview region 3000 of display panel 132, first display area 1331, second display area 1332 and third display area 1333 are arranged horizontally in order along the width direction of display panel 132, it is possible to check the finished state of a hard copy, in a similar feeling as if the user is actually turning over the pages of the hard copy.

Further, according to the first embodiment, since second display area 1332 is made to be the greatest among first, second and third display areas 1331, 1332 and 1333, it is possible to improve the visibility when the document images are confirmed by turning.

Moreover, since the images before and after image of the page to be turned displayed in second display area 1332 are given with greater amounts of information, it is possible to easily confirm the image information on pages immediately before and after the image of the page to be turned, especially in the case of duplex printing, hence grasp the relationship of the preview image displayed for confirmation with the images before and after, more easily. Further, use of a recent display panel capable of displaying high-definition images allows the user ease of checking the content of preview images.

The Second Embodiment

Next, the second embodiment of the present invention will be described with reference to the drawings.

Figure 16:
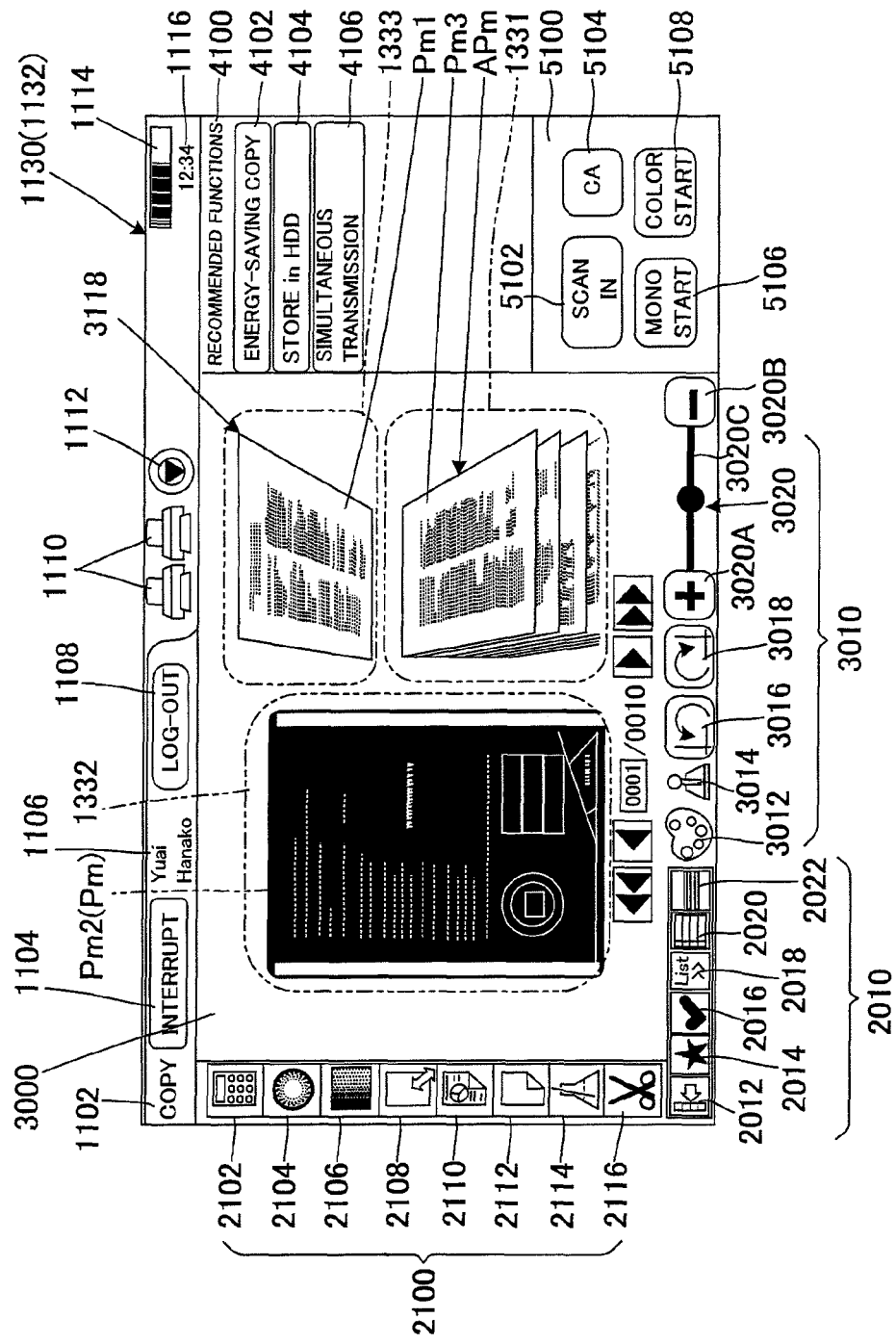
FIG. 16 is an illustrative view showing a display mode of a display panel according to the second embodiment of the present invention.

FIG. 16 is an illustrative view showing a display mode of a display panel according to the second embodiment of the present invention.

The second embodiment is a variational example of the above-described first embodiment, in which first display area 1331, second display area 1332 and third display area 1333 in display panel 132 are given in another layout.

Since the second embodiment has the same configuration as that of image forming apparatus 100 of the first embodiment except for the layout of preview region 3000 in display panel 132 of the first embodiment, components having the same functions and configurations are allotted with the same reference numerals, and their description is omitted.

As shown in FIG. 16, a display panel 1132 of the second embodiment includes a preview region 3000 in which a first display area 1331 that displays a finished state of a hard copy APm in three dimensions, a second display area 1332 that two-dimensionally displays a image of the page to be turned Pm2 (Pm) pagewise in order from first display area 1331 to allow for confirmation and a third display area 1333 that three-dimensionally displays the images of the page to be turned Pm1, Pm2 . . . which have been displayed for confirmation in second display area 1332, in order in a layered manner, are configured.

In the present embodiment, first display area 1331 and third display area 1333 are laid out in pairs at top and bottom, in the right part of preview region 3000 on display panel 1132 while second display area 1332 is displayed in the left part of preview region 3000, separately from first display area 1331 and third display area 1333.

Second display area 1332 is configured to the largest in size among the first, second and third display areas 1331, 1332 and 1333 in preview area 3000. This configuration allows the user ease of checking the content in image of the page to be turned Pm2 displayed in second display area 1332.

The image of the page to be turned Pm2 sequentially turned over pagewise from first display area 1331 is displayed on second display area 1332 with its face oriented frontward.

The image of the page to be turned Pm2 displayed in second display area 1332 is displayed with a greater amount of information than that of each page in first display area 1331 and third display area 1333. Further, the images before and after image of the page to be turned Pm2, specifically, the previous page image Pm1 displayed in third display area 1333 and the following page image Pm3 displayed in first display area 1331, are also displayed with a greater amount of information than those of the other images in respective third display area 1333 and first display area 1331.

Further, on display panel 1132, control keys for operation and control, i.e., so-called task trigger keys such as a scan-in key 5102, a monochrome start key 5106, a color start key 5108, clear-all key 5104 and the like are constantly displayed, as shown in FIG. 16.

When image forming is performed on both sides of a printing sheet, image of the page to be turned Pm2 to be displayed for is displayed in second display area 1332 in such a manner that the front side is displayed first, then the rear side is displayed, and thereafter the page is shifted to third display area 1333.

Further, when image forming is performed on both sides of a printing sheet, image of the page to be turned Pm2 to be displayed is displayed in second display area 1332 in such a manner that the front side is turned in conformity with the bound position of the recording mediums so as to display the rear side.

Furthermore, when image forming is performed on both sides of a printing sheet, image of the page to be turned Pm2 to be displayed is displayed in second display area 1332 in such a manner that the image is positioned closer to first display area 1331 (close to the bottom of preview region 3000) when the front side is displayed and the image is positioned closer to third display area 1333 (close to the top of preview region 3000) when the rear side is displayed.

Next, how the finished state of the hard copy is checked before printing through the preview representation of touch panel display 1130 of the present embodiment will be specifically described with examples.

Example 5

Next, a variational example when the hard copy is finished as a "dual-sided top-bound booklet", will be described.

FIGS. 17a to 17f are illustrative views showing the operation of checking the finished state of the "dual-sided top-bound" hard copy through the preview representation on the display panel of the control unit of the present embodiment.

In display panel 1132 in example 5, as shown in FIGS. 17a to 17f, first display area 1331 and third display area 1333 are laid out in pairs at top and bottom, in the right part of preview region 3000 while second display area 1332 is displayed in the left part of preview region 3000, separately from first display area 1331 and third display area 1333.

Figure 17A:
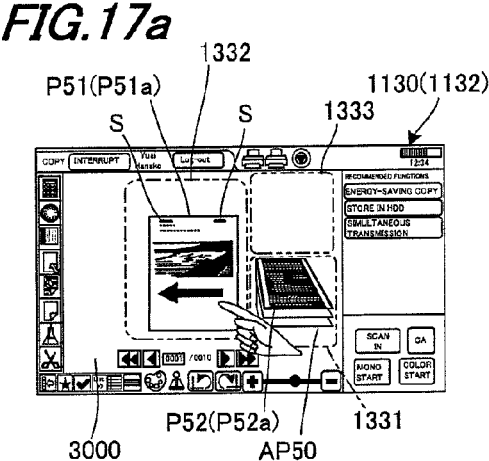

First, when a preview image of a finished material based on the image data of input documents is displayed, the initial screen of display panel 1132 is displayed on touch panel display 1130, as shown in FIG. 17a. At this point, a first sheet image P51 is two-dimensionally displayed in second display area 1332 on the left part of display panel 1132, in such a state that the front side P51a is shown. In first display area 1331 in the lower right part of display panel 1132, a bundle of sheets AP50 consisting of the second and following sheets of hard copy AP50 is three-dimensionally displayed in such a state that the front side P52a of the second sheet image P52 is shown. Here, image P51 is displayed to be larger than image P52.

At this point, the first sheet image P51 displayed in second display area 1332 is displayed closer to first display area 1331 (close to the bottom of preview region 3000).

Figure 17B:
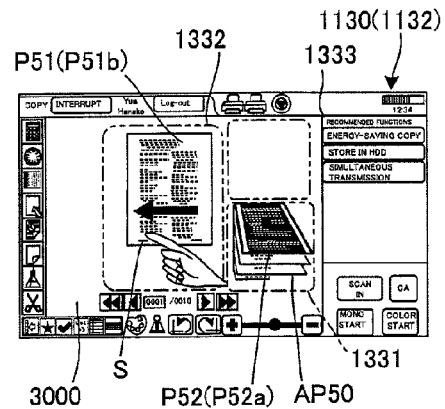
Figure 17C:
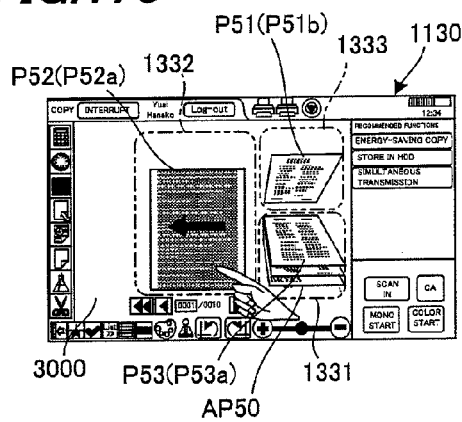
Figure 17C:
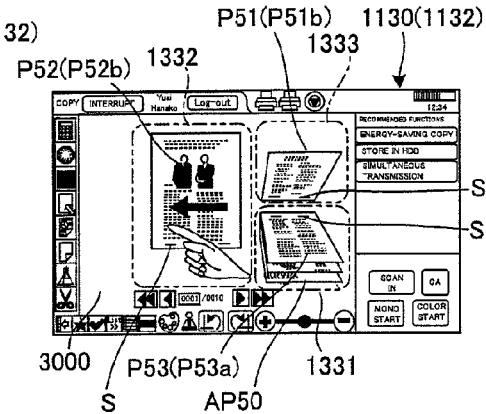

Then, as the front side P51a of first sheet image P51 is touched in a sliding manner (flicked) so as to give instructions to turn over the page, the first sheet image P51 is turned 180 degrees vertically, shifting closer to third display area 1333 (to the top of preview region 3000), and displayed two-dimensionally in a state where the rear side P51b is displayed as in FIG. 17b.

Next, when the second sheet image P52 is displayed for confirmation, the first sheet image P51 is touched in a sliding manner (flicked) in the direction of the arrow (from right to left) as shown in FIG. 17b so as to give instructions to turn over the page. As a result, the first sheet image P51 is reduced in size, shifted to third display area 1333 in the upper right part of display panel 1132 and displayed three-dimensionally in a state where the rear side P51b is displayed as in FIG. 17c.

Then, in link with the movement of first sheet image P51, the second sheet image P52 moves from the first display area 1331 toward the vacant second display area 1332 while it is being enlarged, and is displayed in the second display area 1332 in such a state that the front side P52a is enlarged and displayed two-dimensionally.

At this point, the second sheet image P52 displayed in second display area 1332 is arranged closer to first display area 1331 (close to the bottom of preview region 3000).

When the rear side P52b of the second sheet image P52 is displayed, the front side P52a of second sheet image P52 is touched in a sliding manner (flicked) to give instructions to turn over the page as shown in FIG. 17d. As a result, the second sheet image P52 is turned 180 degrees in the vertical direction whilst shifting closer to third display area 1333 (close to the top of preview region 3000), and displayed two-dimensionally in a state where the rear side P52b is shown.

Next, when the third sheet image P53 is displayed for confirmation, the second sheet image P52 is touched in a sliding manner (flicked) in the direction of the arrow (from right to left) as shown in FIG. 17d so as to give instructions to turn over the page. As a result, the second sheet image P52 is reduced in size, shifted so as to overlap and hide part of the first sheet image P51 and displayed three-dimensionally in a state where the rear side P52b is displayed as in FIG. 17e.

Figure 17E:
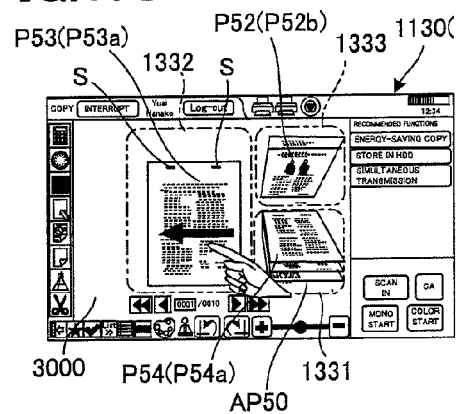

Then, in link with the movement of second sheet image P52, the third sheet image P53 moves from the first display area 1331 toward the vacant second display area 1332 while it is being enlarged, and is displayed in the second display area 1332 in such a state that the front side P53a is enlarged and shown two-dimensionally, as shown in FIG. 17e.

After this, similar operations as the above are repeated so that the user is able to confirm the finished state of hard copy AP50 while checking the content of images.

Figure 17F:
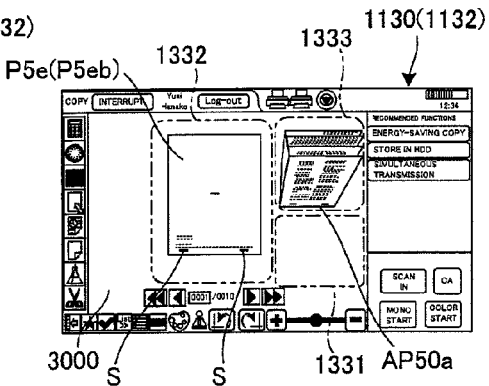

Then, finally, the rear side of P5eb of the final sheet image P5e is enlarged and displayed two-dimensionally in second display area 1332 while a bundle of preceding pages AP50a before the final page is three-dimensionally displayed in third display area 1333, as shown in FIG. 17f.

Further, in touch panel display 1130, the image of hard copy AP50 in its finished state displayed in first display area 1331 is touched in a sliding manner (flicked) so as to turn over pages in order from the first sheet image P51 in first display area 1331 so that the pages are displayed in second display area 1332 and then shifted to third display area 1333 to be displayed three-dimensionally. With this arrangement, the user is able to check the displayed content of the hard copy in a feeling as if the user is turning over the pages while actually holding "dual-sided top-bound" hard copy AP50 at the bound position S (FIG. 17a). In this way, the user can easily confirm the finished state of "dual-sided top-bound" hard copy AP50.

Though in the above example with FIGS. 17a to 17f, instructions of turning over the page are given by a sliding touch (flicking) in the horizontal direction, in the case of a "dual-sided top-bound" hard copy, instructions of turning over the page may be given by a sliding touch (flicking) in the vertical direction.

Referring next to the drawings, specific description will be given on the operation of making the transition of the front side image of a sheet to the rear side image by turning the preview image of the sheet of the "dual-sided top-bound" hard copy in the vertical direction.

FIGS. 18a to 18h are illustrative views showing a state in which a sheet of a "dual-sided top-bound" hard copy, displayed in preview representation on the display panel of the control unit of the present embodiment, is rotated from the front side to the rear side.

When image of the page to be turned P202 is displayed in second display area 1332 with its front side P202a displayed as in FIG. 18a, image of the page to be turned P202 is displayed at a position closer to first display area 1331 or closer to the bottom of preview region 3000.

When rear side P202b of image of the page to be turned P202 is displayed for confirmation, as shown in FIG. 18a, front side P202a of image of the page to be turned P202 is touched in a sliding manner (flicked) so as to give instructions of turning over the page upwards. As a result, image of the page to be turned P202 rotates 180 degrees vertically from the bottom to top, pivoting on a horizontal edge E2 located on the bound side S of image of the page to be turned P202, as shown in FIGS. 18b to 18g.

Then, image of the page to be turned P202 is displayed with its rear side P202b displayed as in FIG. 18h. At this point, the rear side P202b of image of the page to be turned P202 is displayed at a position closer to third display area 1333, or closer to the top of preview region 3000.

Further, as shown in FIG. 18a, the previous image P201 immediately before image of the page to be turned P202 displayed in second display area 1332 is displayed with a greater amount of information than those of the images in third display area 1333 while the subsequent image P203 immediately after image of the page to be turned P202 displayed in second display area 1332 is displayed with a greater amount of information than those of the images in first display area 1331. With this display style, the user can easily check the information on the images P201 and P203 immediately before and after the image of the page to be turned P202 and can grasp the relationship of the preview image displayed for confirmation with the images immediately before and after, more efficiently.

As above, in a case of a dual-sided bound hard copy, it is possible to check the displayed content in the same feeling as if the user is turning over pages along the bound position S whilst actually holding the hardcopy. As a result, it is possible to easily confirm the finished state of the hard copy.

As above, according to the second embodiment, in preview region 3000 of display panel 1132, first display area 1331 and third display area 1333 are arranged in pair at top and bottom on the right part of preview region 3000 while second display area 1332 is arranged on the left part of preview region 3000, separately from first display area 1331 and third display area 1333. Accordingly, the user can easily recognize the bound state S of the hard copy and readily check the page position and content of the image of the page to be turned.

It should be noted that the layout of display areas in the preview region on the display unit is not limited to the configurations of the above embodiment and examples.

Referring next to the drawings, description will be made on variational layout examples of first display area 1331, second display area 1332 and third display area 1333 in the preview region on the display panel according to the above embodiment.

Figure 19:
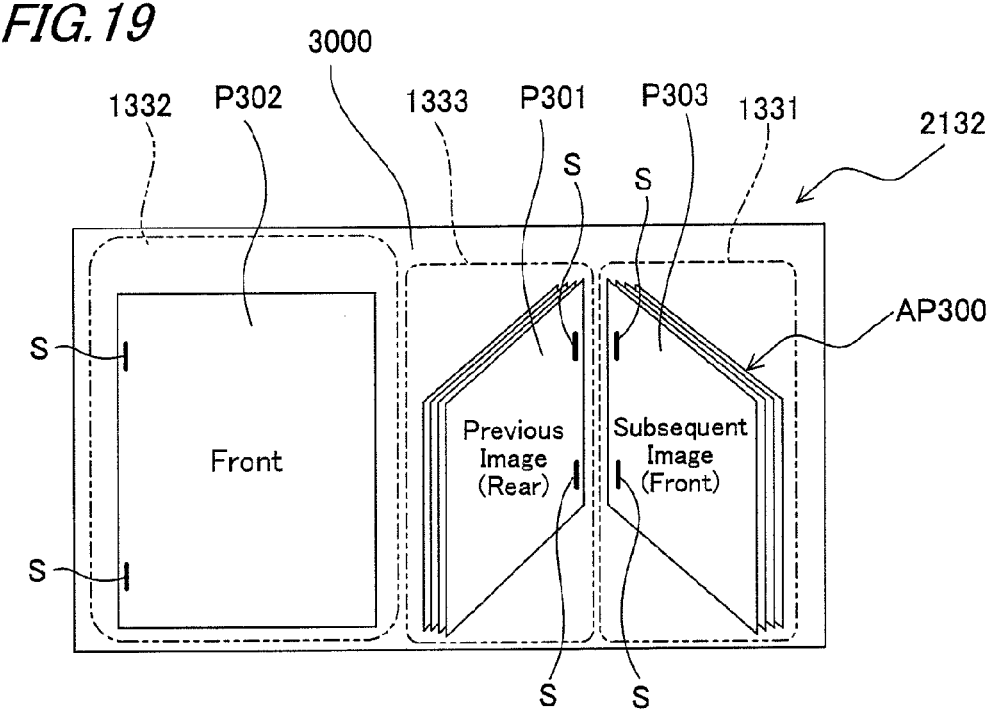
FIG. 19 is an illustrative view showing a variational example 1 of the layout in a preview region on a display panel according to the present invention; and, FIG. 20 is an illustrative view showing a variational example 2 of the layout in a preview region on the display panel.
Figure 20:
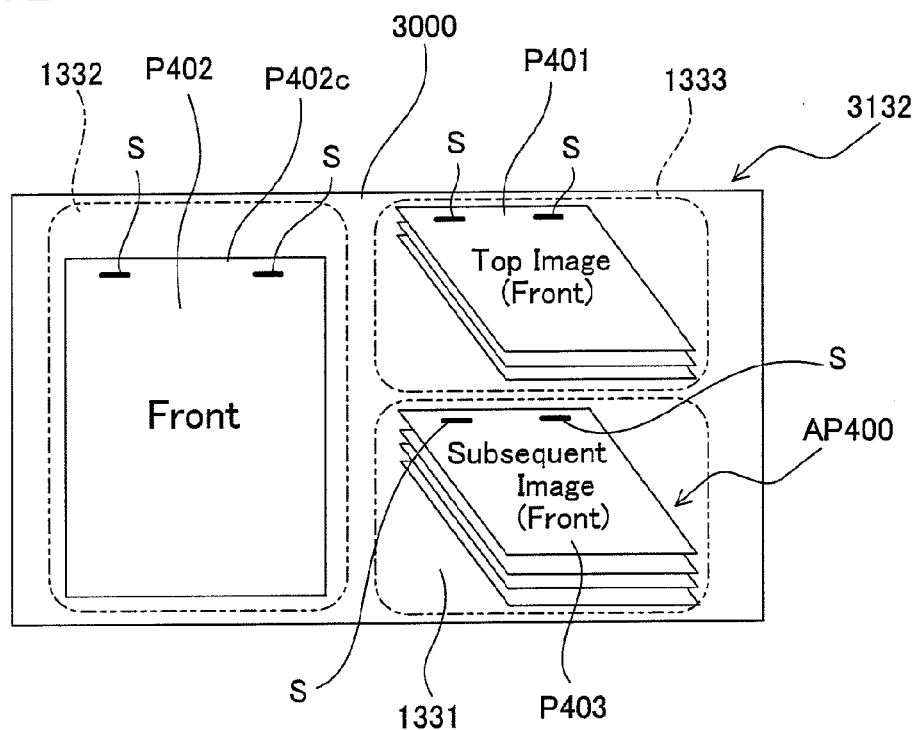

FIG. 19 is an illustrative view showing a variational layout example 1 in the preview region on the display panel. FIG. 20 is an illustrative view showing a variational layout example 2 in the preview region on the display panel.

Variational Example 1

Variational example 1 provides a variational configuration for a "dual-sided left bound" hard copy when it is finished.

A display panel 2132 of variational example 1 is configured as shown in FIG. 19 so that a second display area 1332 that displays an image of the page to be turned P302 for confirmation is laid out in the left part of preview region 3000 while a first display area 1331 and third display area 1333 are arranged in pairs at left and right in the right part of preview region 3000.

Here, first display area 1331 is an area for displaying the finished state of a hard copy AP300 in three dimensions. Third display area 1333 is an area where images of the page to be turned P301, P302 . . . which have been displayed for confirmation in second display area 1332 are sequentially laid over and displayed three-dimensionally.

The geometrical relationship between first display area 1331 and third display area 1333 is that similarly to the finished state of the hard copy, first display area 1331 for showing the pages following image of the page to be turned P302 is displayed on the right-hand side and third display area 1333 for showing the pages preceding image of the page to be turned P302 is displayed on the left-hand side.

Herein, first display area 1331 displays the front image of the following page of image of the page to be turned P302 while third display area 1333 displays the rear image of the preceding page of image of the page to be turned P302.

A reference symbol S in FIG. 19 shows the bound position.

Similarly to the above-described embodiment, second display area 1332 is set up to be the largest area among the first to third display areas 1331 to 1333.

As configured described above, also in variational example 1, the user can easily confirm the content of image of the page to be turned P302 being displayed in second display area 1332, and can further readily check the relationship of the document image P302 with preceding and following document images with simple recognition of bound state S of the hard copy to thereby grasp the concrete concept of the whole hard copy of a "dual-sided left bound booklet" with ease. As a result, the user is able to imagine the finished state of hard copy AP300 in a simple manner.

Variational Example 2

Variational example 2 provides a preview region layout for a "one-sided top bound" hard copy when it is finished.

A display panel 3132 of variational example 2 is configured as shown in FIG. 20 so that a second display area 1332 that displays a image of the page to be turned P402 for confirmation is laid out in the left part of preview region 3000 while a first display area 1331 and third display area 1333 are arranged in pairs at top and bottom on the right part of preview region 3000.

First display area 1331 is an area for displaying the finished state of a hard copy AP400 in three dimensions. Third display area 1333 is an area where images of the page to be turned P401, P402 ... which have been displayed for confirmation in second display area 1332 are sequentially laid over and displayed three-dimensionally.

The geometrical relationship between first display area 1331 and third display area 1333 is that similarly to the finished state of the hard copy, first display area 1331 for showing the pages following image of the page to be turned P402 is displayed in the lower part and third display area 1333 for showing the pages preceding image of the page to be turned P402 is displayed in the upper part.

First display area 1331 displays the front image of the following page of image of the page to be turned P402 while third display area 1333 displays the front image of the top page.

A reference symbol S in the drawing shows the bound position.

Similarly to the above-described embodiment, second display area 1332 is set up to be the largest area among the first to third display areas 1331 to 1333.

As configured described above, also in variational example 2, the user can easily confirm the content of image of the page to be turned P402 being displayed in second display area 1332, and can further readily check the relationship of the document image with preceding and following document images with simple recognition of bound state S of the hard copy to thereby grasp the concrete concept of the whole hard copy of a "one-sided top bound booklet" with ease. As a result, the user is able to imagine the finished state of hard copy AP400 in a simple manner.

The above embodiment was described taking an example in which control unit 120 is applied to image forming apparatus 100 shown in FIG. 1. However, as long as it is an image forming apparatus in which document images are presented in preview representation on the display panel or the like before printing so as to enable confirmation of the printed condition, the invention can be developed to any other image forming apparatus and the like, not limited to the image forming apparatus and copier having the configuration described above.

Further, though, in the above description, a sliding touch (flick control) with the operator's finger is used as the technique to move the preview images displayed on touch panel display 130, keys for moving up, down, left and right may be displayed on touch panel display 130 so as to allow the operator to touch these keys to give movement instructions.

Having described heretofore, the present invention is not limited to the above embodiments, various changes can be made within the scope of the appended claims. That is, it is apparent that various kinds of variations and modified examples will occur to those skilled in the art within the scope of the appended claims. That is, any embodied mode obtained by combination of technical means modified as appropriate without departing from the spirit and scope of the present invention should be included in the technical art of the present invention.

What is claimed is:

1. An image forming apparatus that finishes recording mediums with images formed thereon as a hard copy, comprising:
   an input unit for acquiring image data;
   an image forming portion that forms images on recording mediums based on the image data input through the input unit; and,
   an image display operating device including a display portion that displays a preview image based on the image data and a display controller that has a function of presenting plural pages of document images in preview representation on the display portion,
   wherein the display controller includes:
   a finished state preview display controller that displays the finished state of the hard copy that the image forming apparatus can form as a preview image on the display portion and,
   a confirmatory display controller that displays the preview image displayed on the display portion so that each page of the preview image can be turned over, and,
   the display portion includes: with respect to preview display region for displaying the preview image,
   a first display area for three-dimensionally displaying the finished state of the hard copy;
   a second display area for displaying an image for each page associated with the finished states that has been displayed in the first display area, while turning the page in turn; and,
   a third display area for three-dimensionally displaying the pages that have been turned in the second display area with the pages stacked in turned order,
   wherein, when image forming is performed on both sides of the recording medium,
   in the second display area,
   the image of the back side of the page to be turned is displayed after the image of front side of the page to be turned has been displayed, and afterward the image of the page to be turned is displayed in such a manner as to be moved to the third image area, and
   when the image of the front side of the page to be turned is displayed, the image of the front side is located closer to the first display area, and when the image of the back side of the page to be turned is displayed, the image of the back side is located closer to the third display area.

2. The image forming apparatus according to claim 1,
wherein when the image of front side of the page to be turned displayed in the second display area is bound, the image of front side of the page to be turned overlaps an image displayed in the first display area, and a bound portion is displayed in the image of the front side at a position opposite the first display area, and when the image of the back side of the page to be turned displayed in the second display area is bound, the image of the back side of the page to be turned overlaps an image displayed in the third display area, and the bound portion is displayed in the image of the back side at a position opposite the third display are.

3. An image forming apparatus that finishes recording mediums with images formed thereon as a hard copy, comprising:
an input unit for acquiring image data;
an image forming portion that forms images on recording mediums based on the image data input through the input unit; and,
an image display operating device including a display portion that displays a preview image based on the image data and a display controller that has a function of presenting plural pages of document images in preview representation on the display portion, wherein the display controller includes:
a finished state preview display controller that displays the finished state of the hard copy that the image forming apparatus can form as a preview image on the display portion, and,
a confirmatory display controller that displays the preview image displayed on the display portion so that each page of the preview image can be turned over, and,
the display portion includes: with respect to a preview display region for displaying the preview image,
a first display area for three-dimensionally displaying the finished state of the hard copy;
a second display area for displaying an image for each page associated with the finished states that has been displayed in the first display area, while turning the page in turn; and,
a third display area for three-dimensionally displaying the pages that have been turned in the second display area with the pages stacked in turned order,
wherein the second display area is disposed at an approximately central portion of the preview image, and
wherein, when the finished state of the hard copy is one-sided left-bound, the first display area is disposed on a right side, and the third display area is disposed on a left side, with respect to the second display area, and
wherein, when the finished state of the hard copy is one-sided right-bound, the first display area is disposed on a left side, and the third display area is disposed on a right side, with respect to the second display area.

* * * * *